US012706805B2

United States Patent

(12) United States Patent
Gandhi et al.

(10) Patent No.: US 12,706,805 B2
(45) Date of Patent: Aug. 11, 2026

(54) SWITCH FABRIC MODIFICATION SYSTEM

(71) Applicant: Dell Products L.P., Round Rock, TX (US)

(72) Inventors: Gaurav Mukund Gandhi, Pune (IN); Anurag Sushil Chandra, Pune (IN)

(73) Assignee: Dell Products L.P., Round Rock, TX (US)

( * ) Notice: Subject to any disclaimer, the term of this patent is extended or adjusted under 35 U.S.C. 154(b) by 122 days.

(21) Appl. No.: 18/477,842

(22) Filed: Sep. 29, 2023

(65) Prior Publication Data

US 2025/0112824 A1 Apr. 3, 2025

(51) Int. Cl.

| | |
|---|---|
| ***G06F 15/177*** | (2006.01) |
| ***H04L 41/082*** | (2022.01) |
| ***H04L 41/0869*** | (2022.01) |
| ***H04L 41/0893*** | (2022.01) |
| ***H04L 49/253*** | (2022.01) |

(52) U.S. Cl.

CPC ........ *H04L 41/082* (2013.01); *H04L 41/0869* (2013.01); *H04L 41/0893* (2013.01); *H04L 49/255* (2013.01)

(58) Field of Classification Search

CPC . H04L 41/082; H04L 41/0869; H04L 49/255; H04L 41/0893; H04L 41/0886; H04L 49/15; H04L 49/25; H04L 43/0811; H04L 49/111; H04L 49/357; H04L 49/70; H04L 41/0803; H04L 45/48; H04L 45/56; H04L 45/586

See application file for complete search history.

(56) References Cited

U.S. PATENT DOCUMENTS 8,811,153 B1 * 8/2014 Yang .................. H04L 12/4641 370/218

9,529,828 B1 * 12/2016 Schwartz .............. H04L 67/303

12,250,200 B2 * 3/2025 Karas ..................... H04L 63/029

2010/0293316 A1 * 11/2010 Mehrotra ............ H04L 41/0813 710/316

2011/0196958 A1 * 8/2011 Bharadwaj .......... H04L 41/0681 709/224

2015/0003282 A1 * 1/2015 Gourlay .................. H04L 49/65 370/254

(Continued)

*Primary Examiner* — Suraj M Joshi
*Assistant Examiner* — Hao H Nguyen
(74) *Attorney, Agent, or Firm* — Joseph Mencher

(57) ABSTRACT

A switch fabric modification system includes a switch fabric having first switch devices and a primary switch device. The primary switch device detects a second switch device has been connected to the switch fabric and, in response and without subsequently receiving an instruction from a user, verifies a second switch device/switch fabric connectivity of the second switch device to the switch fabric that provides a switch device role for the second switch device by determining that the second switch device/switch fabric connectivity enables data communications that are available to the first switch device(s) that have the switch device role, verifies an operating configuration of the second switch device by determining that it matches an operating configuration of the primary switch device and, response to verifying the second switch device/switch fabric connectivity and the operating configuration of the second switch device, adds the second switch device to the switch fabric.

15 Claims, 24 Drawing Sheets

(56) References Cited

U.S. PATENT DOCUMENTS

2016/0094450 A1* 3/2016 Ghanwani ............. H04L 47/821
370/235
2016/0191308 A1* 6/2016 Berry .................. H04L 41/0886
709/221
2018/0234296 A1* 8/2018 Kasberg .............. H04L 41/0894
2019/0227812 A1* 7/2019 Akkineni ................ G06F 9/442
2019/0334774 A1* 10/2019 Bennett ............... H04L 41/0869
2020/0252331 A1* 8/2020 Singal ...................... H04L 49/25
2020/0396174 A1* 12/2020 Subbiah ................ H04L 49/357
2022/0083348 A1* 3/2022 Chaganti ............. H04L 41/0806
2022/0129536 A1* 4/2022 O'Brien, III .......... G06F 21/572
2022/0173957 A1* 6/2022 Qian ........................ H04L 67/10
2022/0200849 A1* 6/2022 Singal ................. H04L 41/0627
2022/0263707 A1* 8/2022 Kanjirathinkal .... H04L 43/0811
2024/0056704 A1* 2/2024 Kartawira .............. G02B 6/356
2025/0094045 A1* 3/2025 Arai ...................... G06F 3/0634

* cited by examiner

200

200

SWITCH FABRIC MODIFICATION SYSTEM

BACKGROUND

The present disclosure relates generally to information handling systems, and more particularly to modifying a switch fabric provided by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, are sometimes included in switch fabrics that provide for data communication between node devices (e.g., server devices, storage systems, etc.), as well as by the node devices via a network connected to those switch fabrics. For example, node devices may be connected to each other and the network via redundant switch devices in the switch fabric, and those switch devices may be clustered (e.g., in a "cluster" network configuration) such that data communication by the node devices relies entirely on the switch devices that connect them. In some situations, such switch fabrics may require modification, which can raise issues as conventional switch fabric modification techniques are time-consuming and error prone due to the need to perform primarily manual processes that often require a plurality of manual connectivity, compatibility, and/or upgrade operations by a network administrator and/or other user in order to modify the switch fabric as desired.

Accordingly, it would be desirable to provide a switch fabric modification system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a switch fabric modification engine that is configured to: detect that a second switch device has been connected to a switch fabric that includes the IHS and, in response and without subsequently receiving an instruction from a user: verify a second switch device/switch fabric connectivity of the second switch device to the switch fabric that provides a switch device role for the second switch device by determining that the second switch device/switch fabric connectivity enables data communications that are available to one or more of a plurality of first switch devices in the switch fabric that have the switch device role; verify a second switch device operating configuration of the second switch device by determining that the second switch device operating configuration matches an IHS operating configuration of the IHS; and add, in response to verifying the second switch device/switch fabric connectivity and the second switch device operating configuration, the second switch device to the switch fabric.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
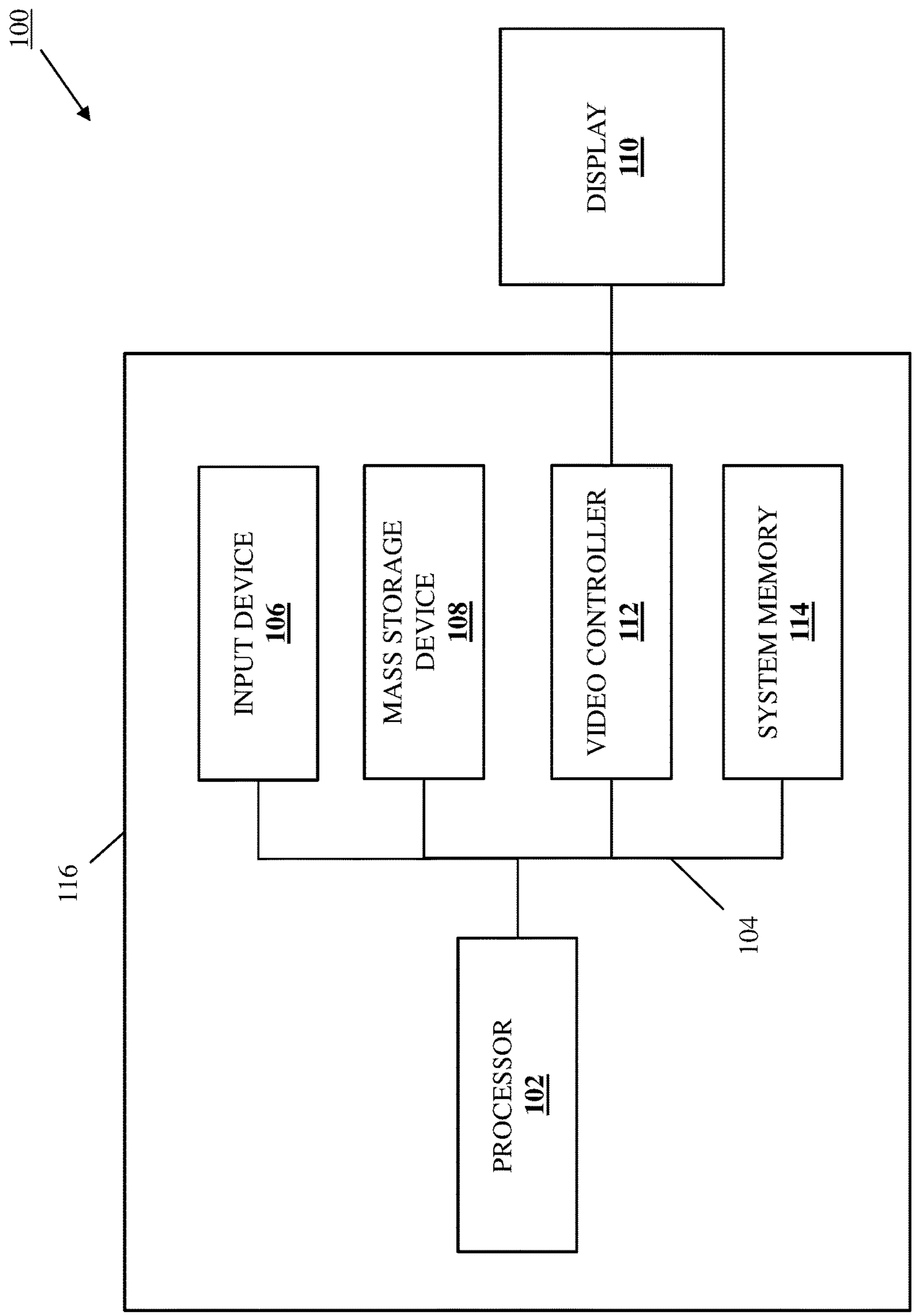
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
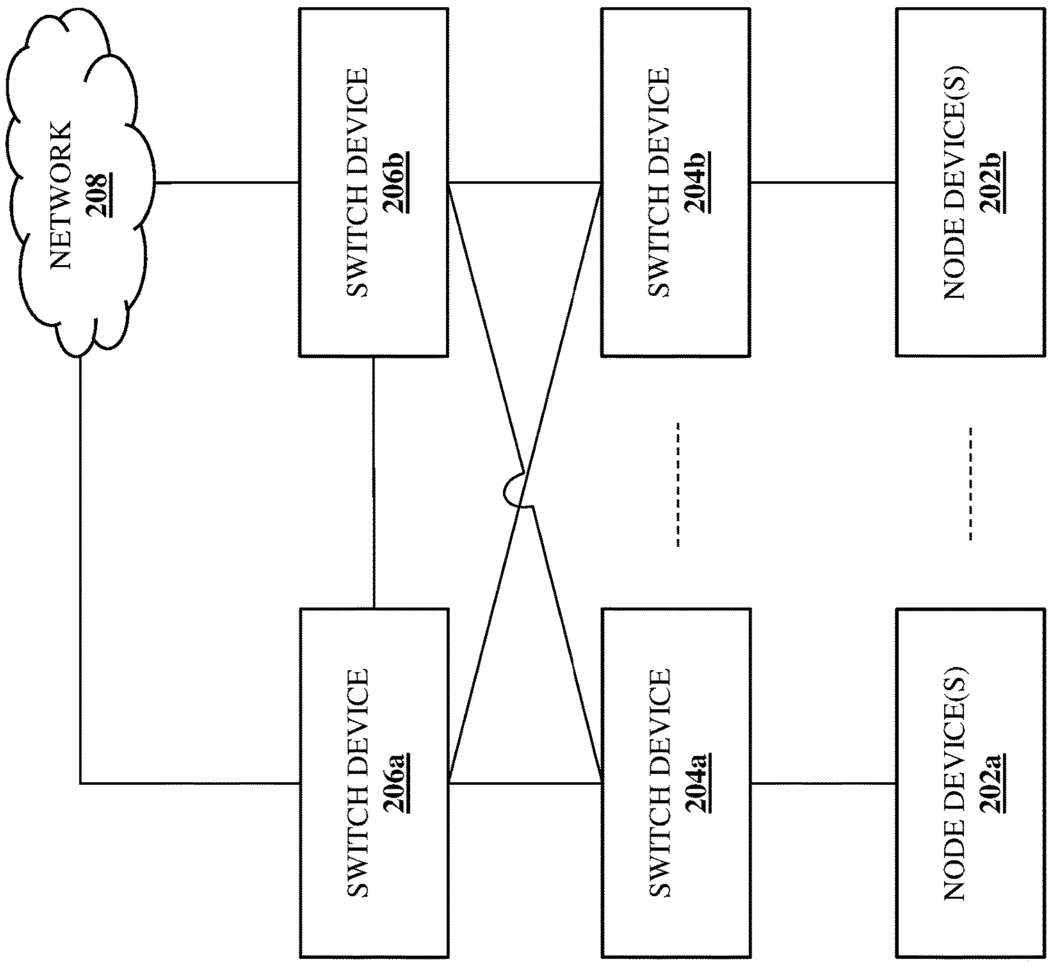
FIG. 2 is a schematic view illustrating an embodiment of a networked system that includes a switch fabric that may provide the switch fabric modification system of the present disclosure.

Referring now to FIG. 2, an embodiment of a networked system 200 is illustrated that includes a switch fabric that may provide the switch fabric modification system of the present disclosure, and one of skill in the art in possession of the present disclosure will appreciate how the networked system 200 may be provided in a datacenter or other switch fabric environments known in the art. In the illustrated embodiment, the networked system 200 includes a plurality of node devices 202*a* and up to 202*b*. In an embodiment, the node devices 202*a*-202*b* may be provided by the IHS 100 discussed above with reference to FIG. 1, and/or may include some or all of the components of the IHS 100, and in specific examples may be provided by a plurality of server devices, a plurality of storage systems, and/or other computing systems that would be apparent to one of skill in the art in possession of the present disclosure. However, while illustrated and discussed as being provided by particular node devices, one of skill in the art in possession of the present disclosure will recognize that node devices provided in the networked system 200 may include any devices that may be configured to operate similarly as the node devices 202*a*-202*b* discussed below.

In the illustrated embodiment, the networked system 200 also includes a plurality of switch devices 204*a* and up to 204*b*, each of which is connected to respective node device(s) 202*a* and up to 202*b*. In an embodiment, the switch devices 204*a*-204*b* may be provided by the IHS 100 discussed above with reference to FIG. 1, and/or may include some or all of the components of the IHS 100, and in the specific examples discussed below are provided by a plurality of leaf switch devices (i.e., switch devices having a "leaf switch role"). However, while illustrated and discussed as being provided by leaf switch devices, one of skill in the art in possession of the present disclosure will recognize that switch devices provided in the networked system 200 may include other switch devices (e.g., Top Of Rack (TOR) switch devices) and/or other fabric devices that may be configured to operate similarly as the switch devices 204*a*-204*b* discussed below.

In the illustrated embodiment, the networked system 200 also includes a plurality of switch devices 206*a* and up to 206*b*, each of which is connected to each of the switch devices 204*a*-204*b*, as well as to a network 208 that may be provided by a Local Area Network (LAN), the Internet, combinations thereof, and/or any other network that would be apparent to one of skill in the art in possession of the present disclosure. In an embodiment, the switch devices 206*a*-206*b* may be provided by the IHS 100 discussed above with reference to FIG. 1, and/or may include some or all of the components of the IHS 100, and in the specific examples discussed below are provided by a plurality of spine switch devices (i.e., switch devices having a "spine switch role"). However, while illustrated and discussed as being provided by spine switch devices, one of skill in the art in possession of the present disclosure will recognize that switch devices provided in the networked system 200 may include other fabric devices that may be configured to operate similarly as the switch devices 206*a*-206*b* discussed below.

As will be appreciated by one of skill in the art in possession of the present disclosure, the switch devices 204*a*-204*b* and 206*a*-206*b* in FIG. 2 may operate to provide the switch fabric described below, and may include other switch fabric components that are not illustrated but that would be apparent to one of skill in the art in possession of the present disclosure. Furthermore, while a specific networked system 200 has been illustrated and described, one of skill in the art in possession of the present disclosure will recognize that the networked system of the present disclosure may include a variety of components and component configurations for providing conventional functionality, as well as the switch fabric modification functionality discussed below, while remaining within the scope of the present disclosure as well.

Figure 3:
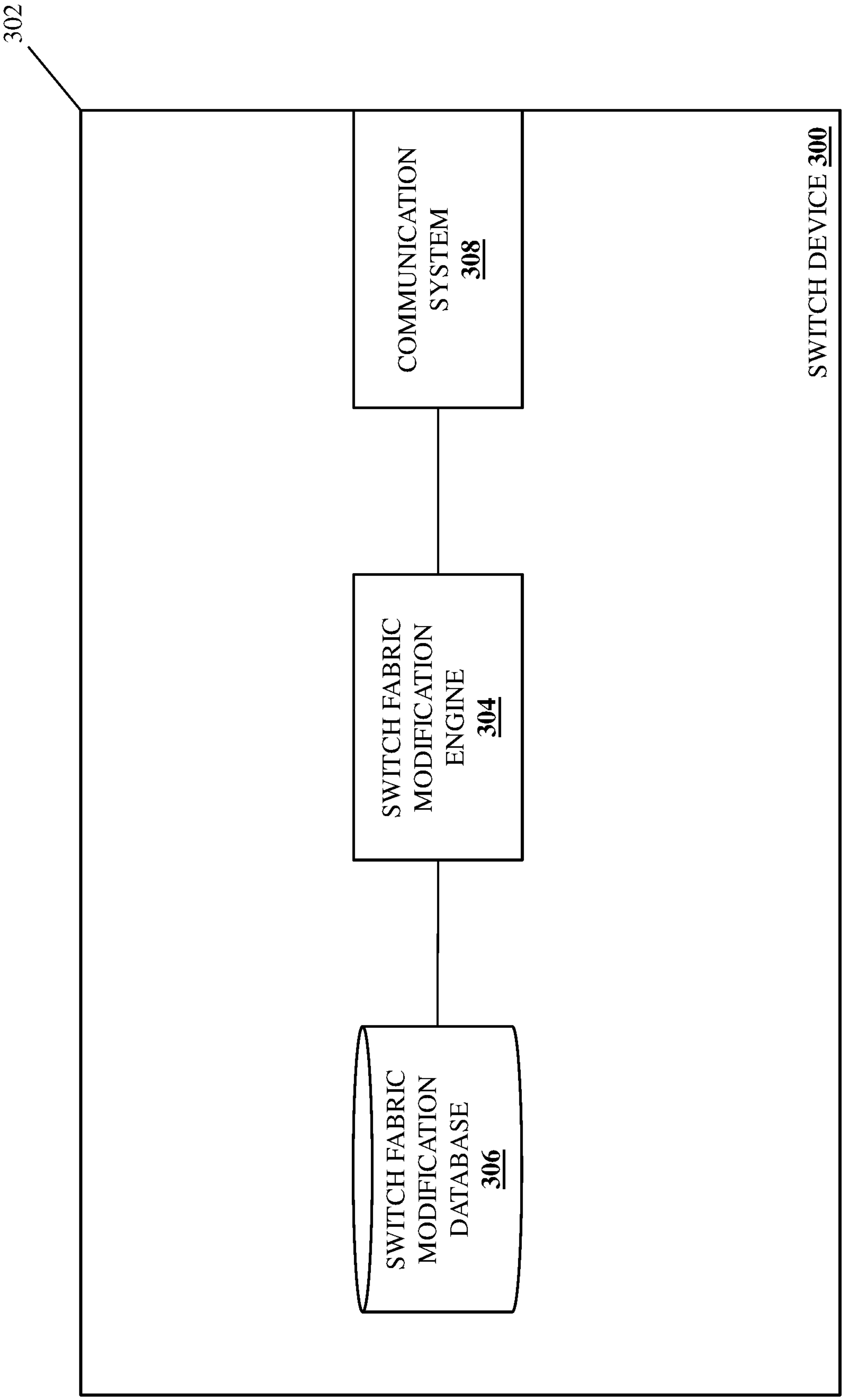
FIG. 3 is a schematic view illustrating an embodiment of a switch device that may be included in the switch fabric of FIG. 2 and that may provide the switch fabric modification system of the present disclosure.

Referring now to FIG. 3, an embodiment of a switch device 300 is illustrated that may provide any or each of the switch devices 204*a*-204*b* and 206*a*-206*b* discussed above with reference to FIG. 2. As such, the switch device 300 may be provided by the IHS 100 discussed above with reference to FIG. 1 and/or may include some or all of the components of the IHS 100, and in different embodiments may be provided by a TOR switch device, a leaf switch device, or a spine switch device. Furthermore, while illustrated and discussed as being provided by specific switch devices, one of skill in the art in possession of the present disclosure will recognize that the functionality of the switch device 300 discussed below may be provided by other devices that are configured to operate similarly as the switch device 300 discussed below.

In the illustrated embodiment, the switch device 300 includes a chassis 302 that houses the components of the switch device 300, only some of which are illustrated and described below. For example, the chassis 302 may house a processing system (not illustrated, but which may be similar to the processor 102 discussed above with reference to FIG. 1) and a memory system (not illustrated, but which may be similar to the memory 114 discussed above with reference to FIG. 1) that is coupled to the processing system and that includes instructions that, when executed by the processing system, cause the processing system to provide a switch fabric modification engine 304 that is configured to perform the functionality of the switch fabric modification engines, switch fabric modification subsystems, and/or switch devices discussed below.

The chassis 302 may also house a storage system (not illustrated, but which may be similar to the storage 108 discussed above with reference to FIG. 1) that is coupled to the switch fabric modification engine 304 (e.g., via a coupling between the storage system and the processing system) and that includes a switch fabric modification database 306 that is configured to store any of the information utilized by the switch fabric modification engine 304 discussed below. The chassis 302 may also house a communication system 308 that is coupled to the switch fabric modification engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific switch device 300 has been illustrated and described, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the switch fabric modification functionality discussed below, while remaining within the scope of the present disclosure as well.

Figure 4A:
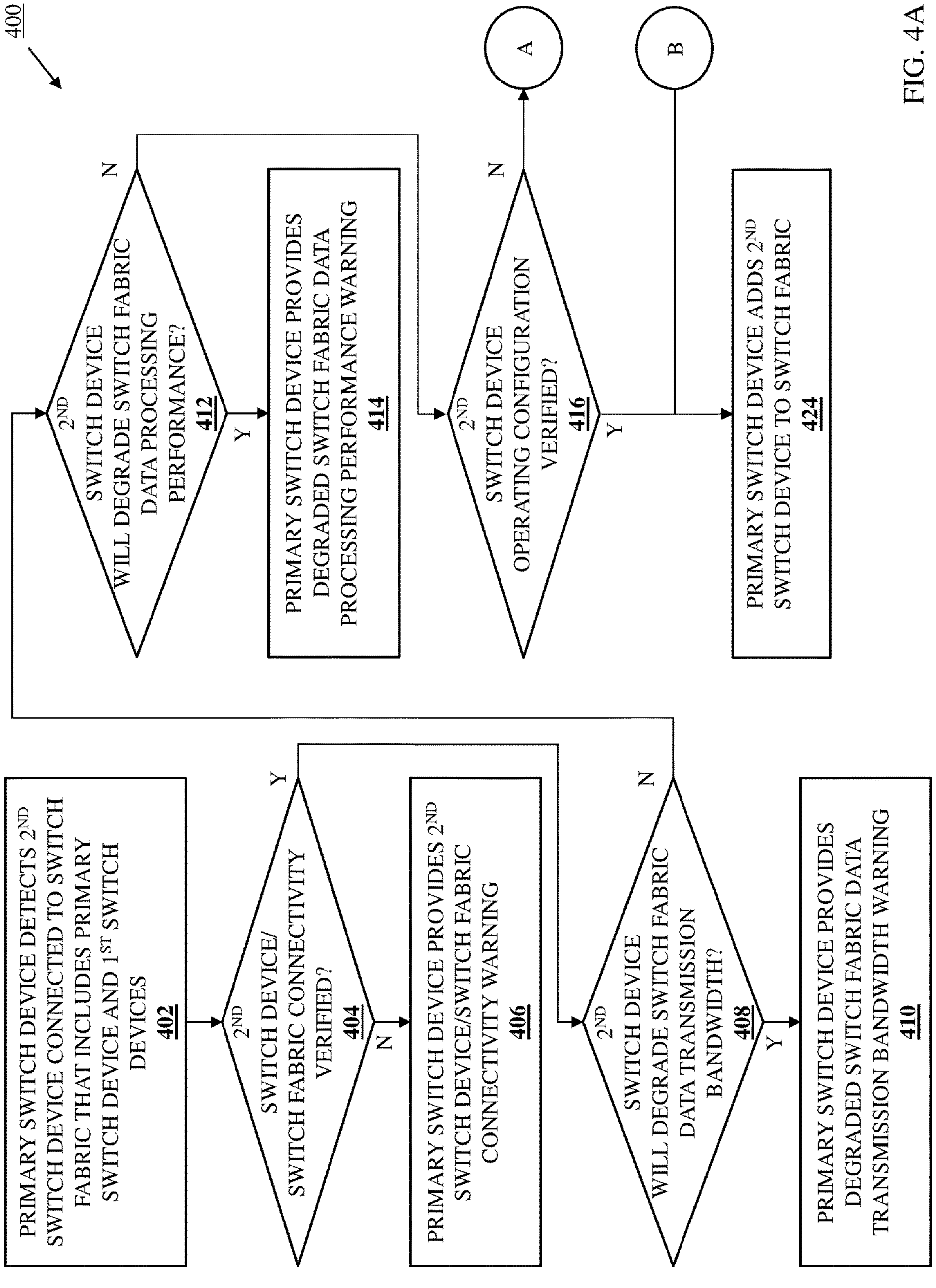
FIGS. 4A and 4B are a flow chart illustrating an embodiment of a method for modifying a switch fabric.
Figure 4B:
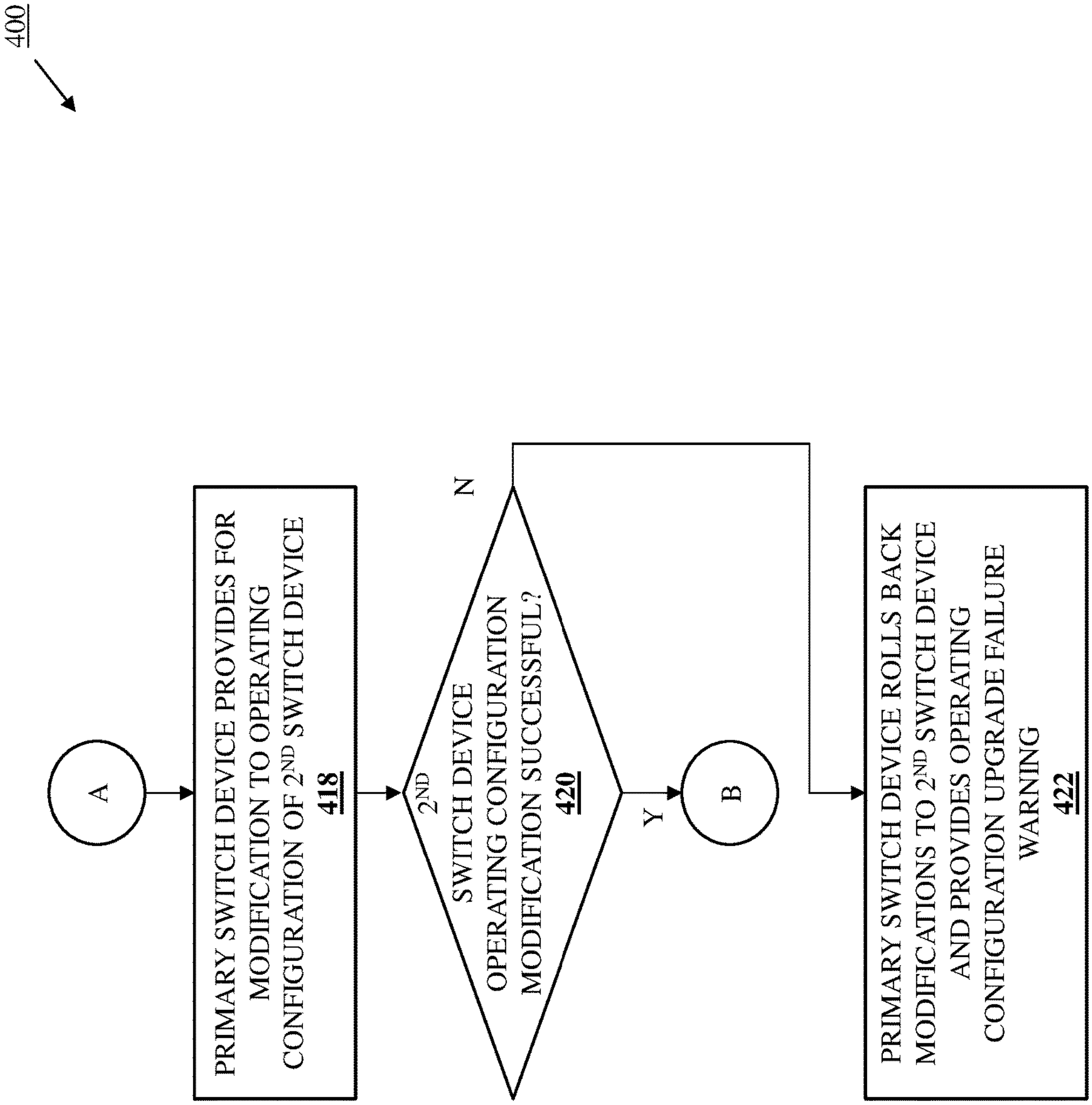

Referring now to FIGS. 4A and 4B, an embodiment of a method 400 for modifying a switch fabric is illustrated. As discussed below, the systems and methods of the present disclosure automate modifications to a switch fabric such as the addition or replacement of a switch device in that switch fabric. For example, the switch fabric modification system of the present disclosure may include a switch fabric having first switch devices and a primary switch device. The primary switch device detects a second switch device has been connected to the switch fabric and, in response and without subsequently receiving an instruction from a user, verifies a second switch device/switch fabric connectivity of the second switch device to the switch fabric that provides a switch device role for the second switch device by determining that the second switch device/switch fabric connectivity enables data communications that are available to the first switch device(s) that have the switch device role, verifies an operating configuration of the second switch device by determining that it matches an operating configuration of the primary switch device and, response to verifying the second switch device/switch fabric connectivity and the operating configuration of the second switch device, adds the second switch device to the switch fabric. As will be appreciated by one of skill in the art in possession of the present disclosure, the systems and methods described herein allow switch devices to be added or replaced in a switch fabric in an automated manner while maintaining the health and performance of the switch fabric.

Figure 5:
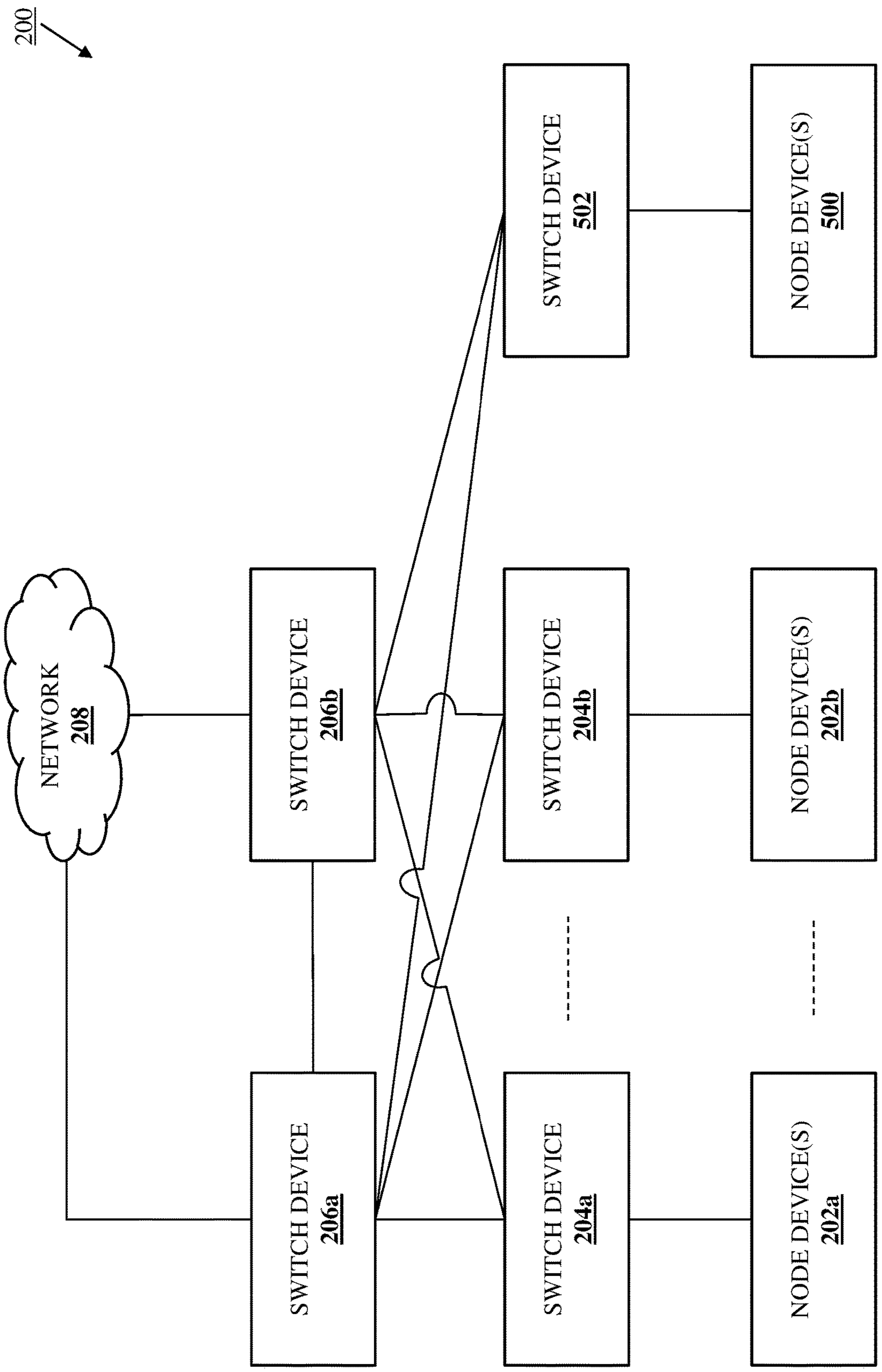
FIG. 5 is a schematic view illustrating an embodiment of a modified switch fabric provided by adding a switch device to the switch fabric of FIG. 2 during the method of FIG. 4.

The method 400 begins at block 402 where a primary switch device detects a second switch device connected to a switch fabric that includes the primary switch device and first switch devices. With reference to FIG. 5, in an embodiment of block 402, a switch device 502 that may be substantially similar to the switch devices 206*a*-206*b* discussed above may be connected to the switch fabric provided by the networked system 200 by, for example, connecting that switch device 502 to each of the switch devices 206*a*-206*b*, as well as connecting that switch device 502 to one or more node devices 500 that may be substantially similar to the node devices 202*a*-202*b* discussed above. As will be appreciated by one of skill in the art in possession of the present disclosure, the addition of the switch device 502 to the switch fabric in the embodiments illustrated and described below provides a specific example of the addition of a leaf switch device to a switch fabric that connects additional node device(s) to that switch fabric (i.e., via the connection of that leaf switch device to spine switch device(s)). However, one of skill in the art in possession of the present disclosure will appreciate how the switch device 502 may be provided as a replacement switch device in the switch fabric (e.g., as a replacement for one of the switch devices 204*a*-204*b* that previously coupled the node device(s) 500 to the switch fabric) while remaining within the scope of the present disclosure as well. Furthermore, while two specific examples have been provided, one of skill in the art in possession of the present disclosure will appreciate how leaf switch devices (and/or TOR switch devices) may be added to switch fabrics in a variety of manners that will fall within the scope of the present disclosure as well.

Figure 6:
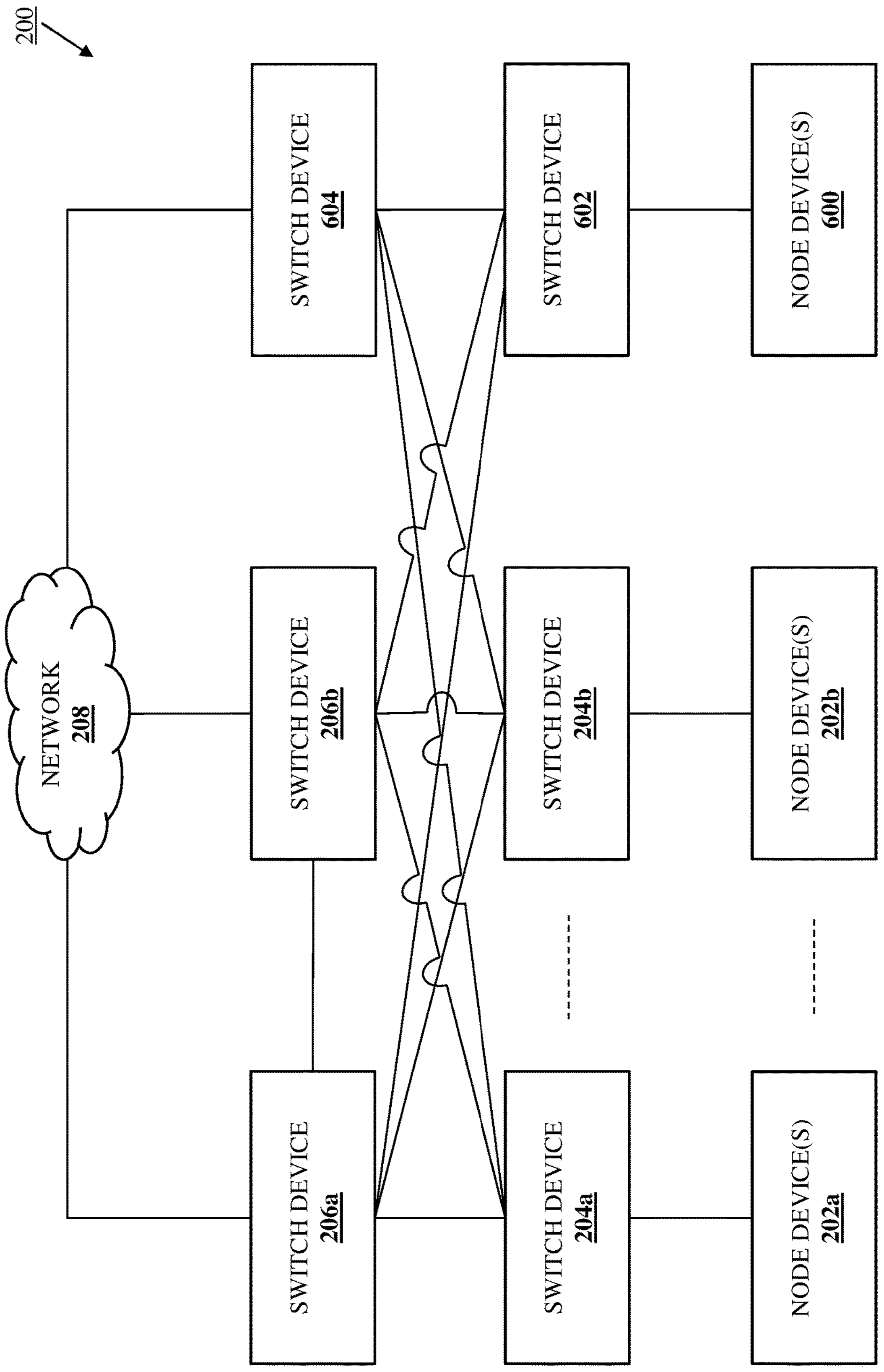
FIG. 6 is a schematic view illustrating an embodiment of a modified switch fabric provided by adding a switch device to the switch fabric of FIG. 2 during the method of FIG. 4.

With reference to FIG. 6, in an embodiment of block 402, a switch device 602 that may be substantially similar to the switch devices 206*a*-206*b* discussed above may be connected to the switch fabric provided by the networked system 200 by, for example, connecting that switch device 602 to each of the switch devices 204*a*-204*b*, connecting that switch device 604 to a switch device 602 (which may be substantially similar to the switch devices 206*a*-206*b* discussed above) that is connected to each of the switch devices 206*a*-206*b* and to one or more node devices 600 that may be substantially similar to the node devices 202*a*-202*b* discussed above. As will be appreciated by one of skill in the art in possession of the present disclosure, the addition of the switch device 602 to the switch fabric in the embodiments illustrated and described below provides a specific example of the addition of a spine switch device to a switch fabric that connects additional node device(s) to that switch fabric (i.e., via the connection of that spine switch device to existing switch devices and a new leaf switch device that is connected to the node devices).

However, one of skill in the art in possession of the present disclosure will appreciate how the switch device 602 may be provided as a replacement switch device in the switch fabric (e.g., as a replacement for one of the switch devices 206*a*-206*b* that previously coupled the node device (s) 600 to the switch fabric) while remaining within the scope of the present disclosure as well. Furthermore, while two specific examples have been provided, one of skill in the art in possession of the present disclosure will appreciate how spine switch devices may be added to switch fabrics in a variety of manners that will fall within the scope of the present disclosure as well. Further still, while the examples below focus on switch fabric modification via the addition/replacement of a leaf switch device in a switch fabric (i.e., the embodiment discussed above with reference to FIG. 5), one of skill in the art in possession of the present disclosure will appreciate how the addition/replacement of a spine switch device in a switch fabric may be performed in a substantially similar manner and thus will fall within the scope of the present disclosure as well.

As will be appreciated by one of skill in the art in possession of the present disclosure, the addition/replacement of a switch device in the switch fabric provided by the networked system 200 at block 402 may be performed in a "hot" switch fabric that is currently operating to transmit data and/or perform other switch fabric operations that would be apparent to one of skill in the art in possession of the present disclosure. However, one of skill in the art in possession of the present disclosure will also appreciate how the addition/replacement of the switch device in the switch fabric provided by the networked system 200 at block 402 may be performed after "taking down" the switch fabric by, for example, powering down the switch devices in the switch fabric (and performing "failover" techniques that move switch fabric operations to a different switch fabric, where available) while remaining within the scope of the present disclosure as well.

In an embodiment, during or prior to the method 400, one of the switch devices in the switch fabric provided by the networked system 200 may operate as a "primary" switch device that operates to manage the automatic switch fabric modification operations described below. For example, the primary switch device may be designated by a network administrator or other user of the switch fabric, may be nominated by the switch devices in the switch fabric using any of a variety of primary device nomination techniques (e.g., by determining the switch device in the switch fabric with the "lowest" switch device identifier) that would be apparent to one of skill in the art in possession of the present disclosure, and or may be provided in any of a variety of manners that would be apparent to one of skill in the art in possession of the present disclosure. In the specific examples below, the switch device 206*b* (e.g., a spine switch device in the embodiments illustrated in FIGS. 5 and 6) provides the primary switch device, but one of skill in the art in possession of the present disclosure will appreciate how any of the switch devices in the switch fabric provided by the networked system 200 may provide the primary switch device while remaining within the scope of the present disclosure as well.

In an embodiment of block 402, the switch fabric modification engine 304 in the "primary" switch device 206*b*/300 may perform switch device connection detection operations that may include monitoring for the connection of the switch device 502 to the switch fabric provided by the networked system 200 (e.g., to provide a "new" switch device in the switch fabric, to replace an "old" switch device in the switch fabric, etc.). For example, following the connection of the switch device 502 to the switch fabric and the powering on of that switch device 502, the switch fabric modification engine 304 in the "primary" switch device 206*b*/300 may detect that switch device 502 using any of a variety of connected device detection techniques that would be apparent to one of skill in the art in possession of the present disclosure. Furthermore, while not illustrated or described in detail, one of skill in the art in possession of the present disclosure will appreciate how the primary switch device 2066*b*/300 may detect the connection of the switch device 604 to the switch fabric (as illustrated in FIG. 6) in a similar manner while remaining within the scope of the present disclosure as well.

Figure 7A:
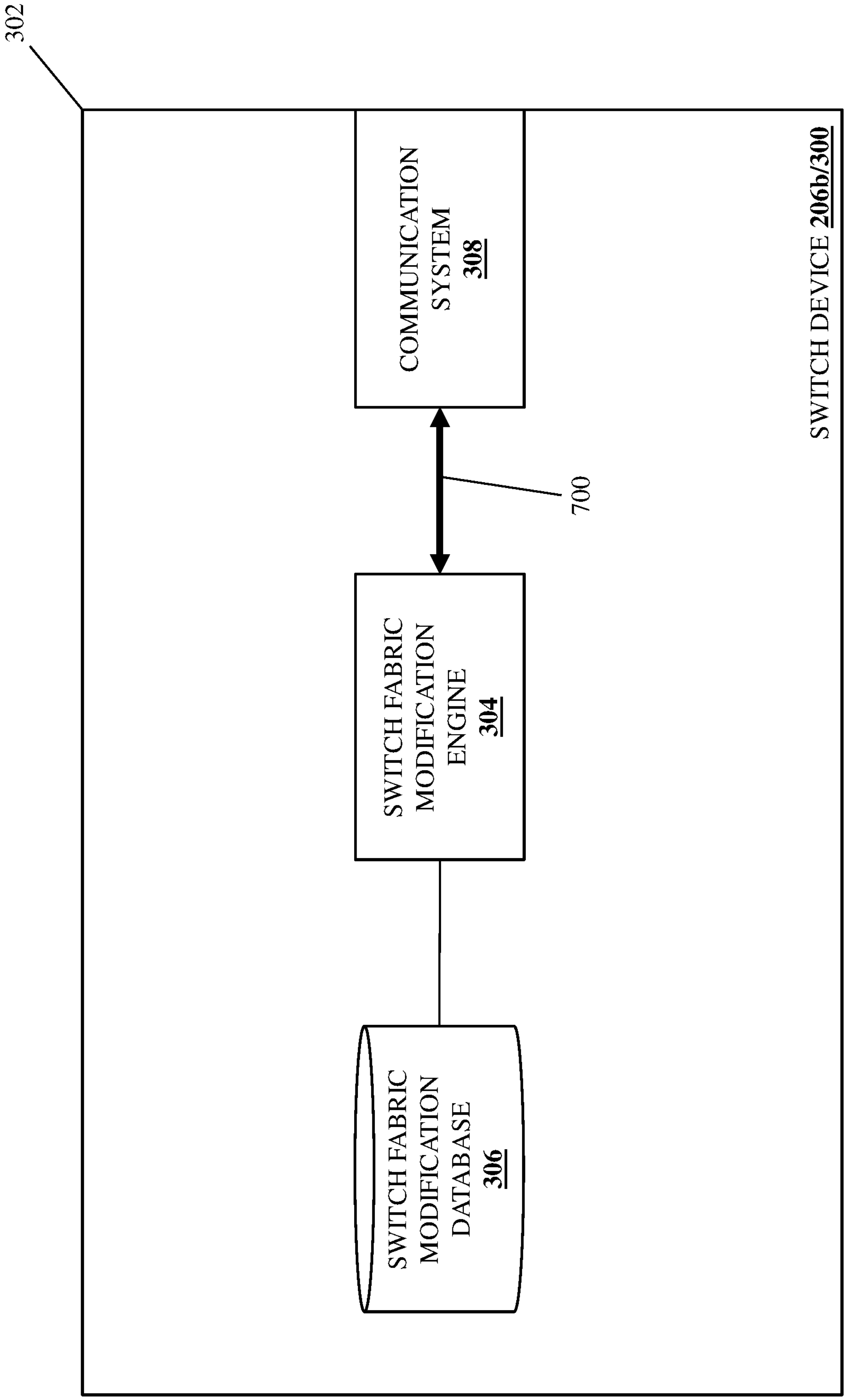
FIG. 7A is a schematic view illustrating an embodiment of the switch device of FIG. 3 operating during the method of FIG. 4.
Figure 7B:
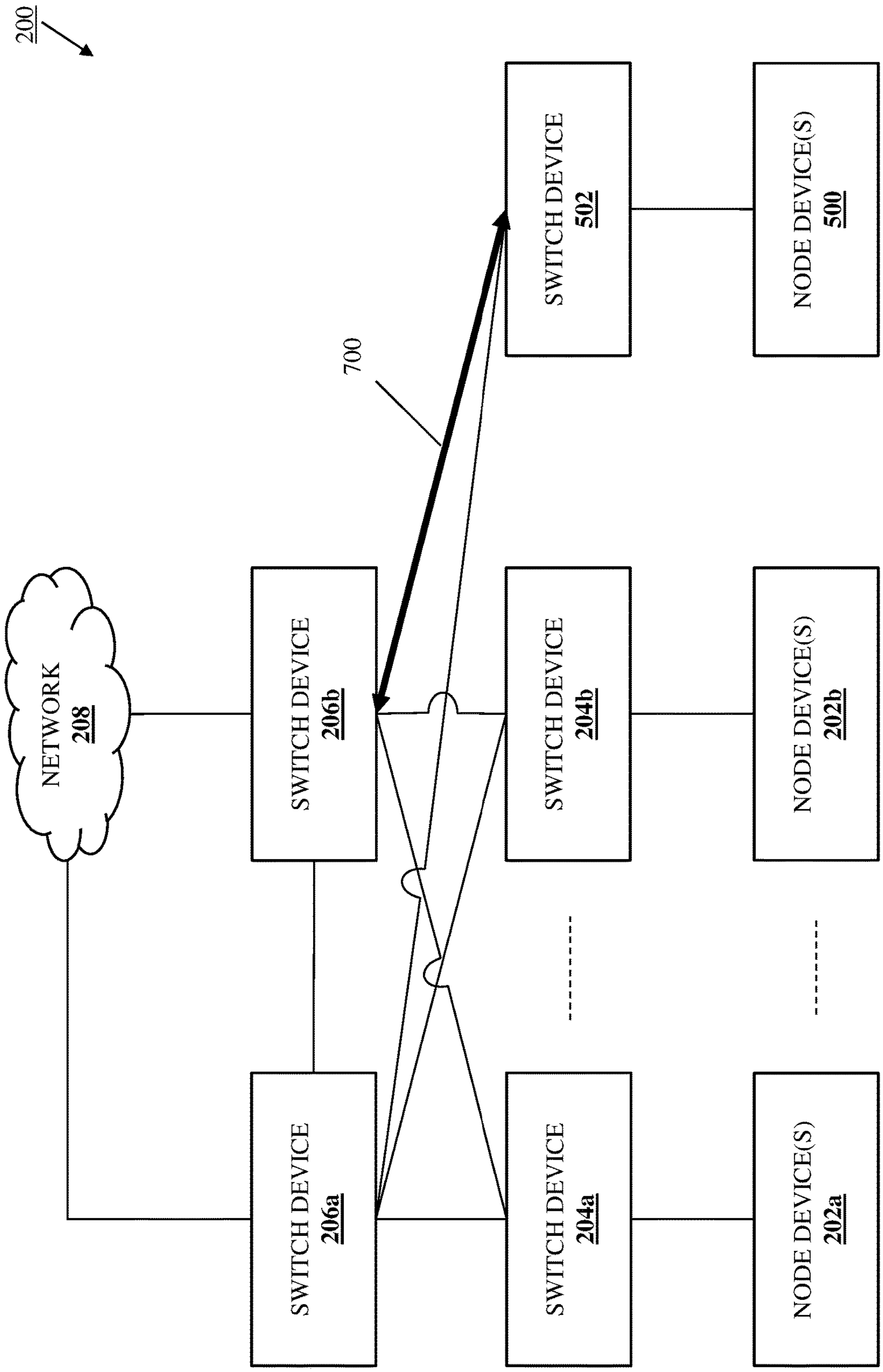
FIG. 7B is a schematic view illustrating an embodiment of the modified switch fabric of FIG. 5 operating during the method of FIG. 4.

The method 400 then proceeds to decision block 404 where the method 400 proceeds depending on whether a second switch device/switch fabric connectivity is verified. With reference to FIGS. 7A and 7B, in an embodiment of decision block 404 and in response to detecting the connection of the switch device 502 to the switch fabric provided by the networked system 200 at block 402, the switch fabric modification engine 304 in the "primary" switch device 206*b*/300 may perform switch device/switch fabric connectivity verification operations 700 that include determining, via its communication system 308, whether the switch device 502 is properly connected to the switch fabric. For example, the switch device/switch fabric connectivity verification operations 700 may include the switch fabric modification engine 304 determining whether the connection of the switch device 502 to the switch fabric enables data communications that are available to the switch devices 204*a*-204*b* that have the switch device role as the switch device 502.

As discussed above, the embodiment illustrated in FIG. 7B provides the switch device 502 connected to the switch fabric to provide the switch device 502 with a leaf switch role, and thus the switch device/switch fabric connectivity verification operations 700 may include determining whether the connection of the switch device 502 to the switch fabric enables data communications that are available to the switch devices 204*a*-204*b* that also have a leaf switch role. However, with reference to FIG. 6, one of skill in the art in possession of the present disclosure will appreciate how switch device/switch fabric connectivity verification operations may include determining whether the connection of the switch device 604 to the switch fabric to provide the switch device 604 with a spine switch role enables data communications that are available to the switch devices 206*a*-206*b* that also have a spine switch role while remaining within the scope of the present disclosure as well. Furthermore, while specific examples of switch device/switch fabric connectivity verification operations have been described, one of skill in the art in possession of the present disclosure will appreciate how the connection of a switch device to a switch fabric may be verified in a variety of manners that will fall within the scope of the present disclosure as well.

If, at decision block 404, the second switch device/switch fabric connectivity is not verified, the method 400 proceeds to block 406 where the primary switch device provides a second switch device/switch fabric connectivity warning. With continued reference to FIG. 7B, in an embodiment of block 406 and in response to determining that the connection of the switch device 502 to the switch fabric does not enable data communications that are available to the switch devices 204*a*-204*b* that also have a leaf switch role (or otherwise determining that the switch device 502 is improperly connected to the switch fabric or that switch device/switch fabric connectivity issues otherwise exist), the switch fabric modification engine 304 in the "primary" switch device 206*b*/300 may generate and provide a switch device/switch fabric connectivity warning for display to a network administrator or other user (e.g., the switch device/switch fabric connectivity warning may be transmitted via the network 208 for display on a management device, not illustrated) that indicates that a connectivity issue exists with the connection of the switch device 502 to the switch fabric provided by the networked system 200.

In some examples, in response to the detection of the connectivity issues with the connection of the switch device 502 to the switch fabric provided by the networked system 200, the switch fabric modification engine 304 in the "primary" switch device 206*b*/300 may analyze the detected connections between the switch device 502 to the switch fabric, identify possible remedial operations that may correct the connectivity issues with the connection of the switch device 502 to the switch fabric, and include those remedial operations as connectivity issue recommendations in the switch device/switch fabric connectivity warning that is provided for display to the network administrator or other user. As such, in the event the switch device 502 is incorrectly or inefficiently connected to the switch fabric, the network administrator or other user may be warned of those connectivity issues, and one of skill in the art in possession of the present disclosure will appreciate how a network administrator or other user may be warned in a similar manner if connectivity issues exist with the connection of the switch device 604 to the switch fabric discussed above with reference to FIG. 6.

Furthermore, the method 400 is illustrated in FIG. 4A as ending in the event connectivity issues exist with the connection of the second switch device to the switch fabric, which one of skill in the art in possession of the present disclosure will appreciate may be appropriate when the second switch device is incorrectly connected to the switch fabric in a manner that will, for example, not allow the second switch device to provide data communications to its connected switch devices and/or node devices. However, in other examples, the method 400 may continue to decision block 408 as discussed below even if a connectivity issues exist with the connection of the second switch device to the switch fabric, which one of skill in the art in possession of the present disclosure will appreciate may be appropriate when the second switch device is inefficiently connected to the switch fabric in a manner that will, for example, still allow the second switch device to provide data communications to its connected switch devices and/or node devices (but in an inefficient manner that should be corrected by the network administrator or other user in response to receiving the switch device/switch fabric connectivity warning discussed above).

Figure 8A:
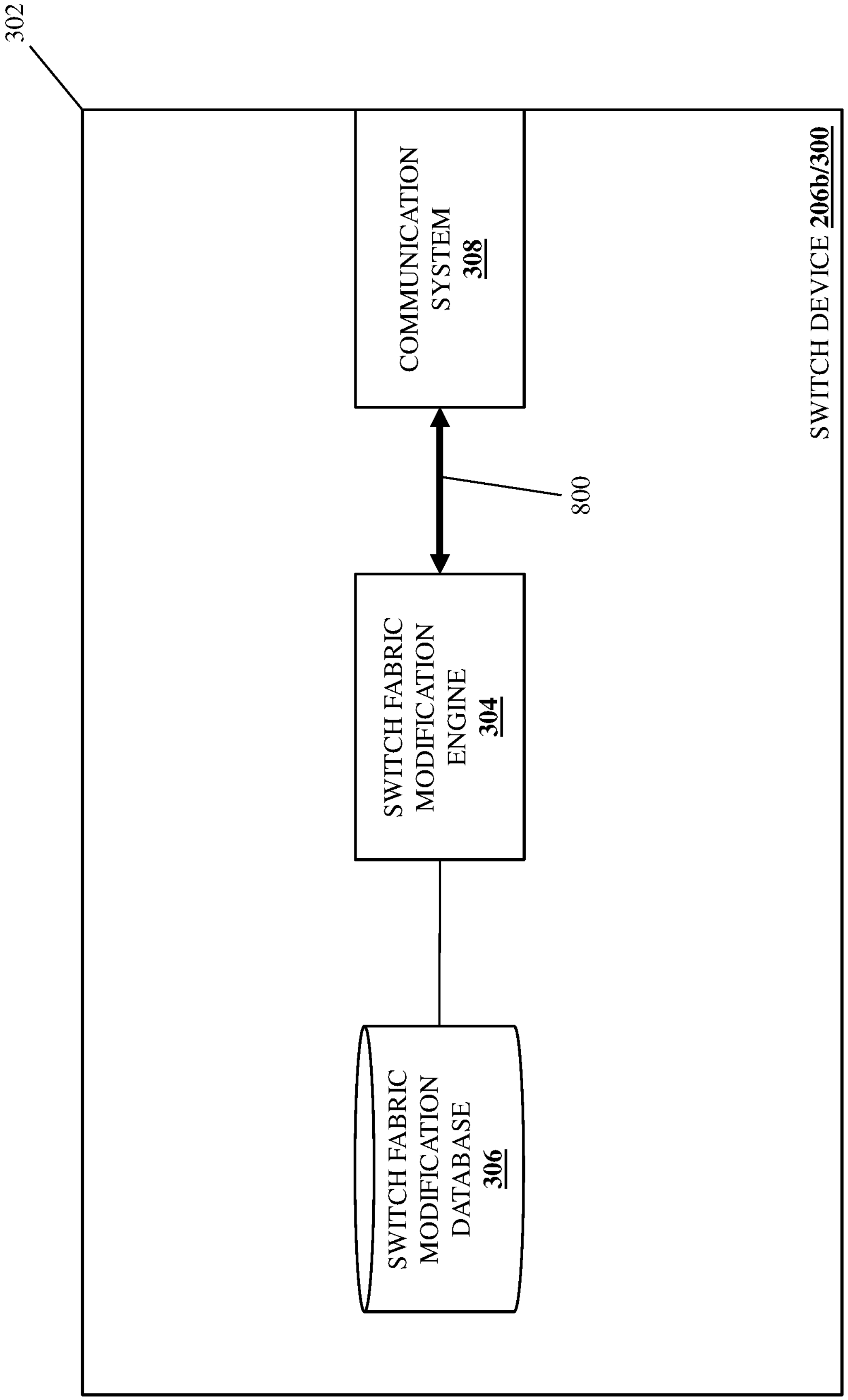
FIG. 8A is a schematic view illustrating an embodiment of the switch device of FIG. 3 operating during the method of FIG. 4.
Figure 8B:
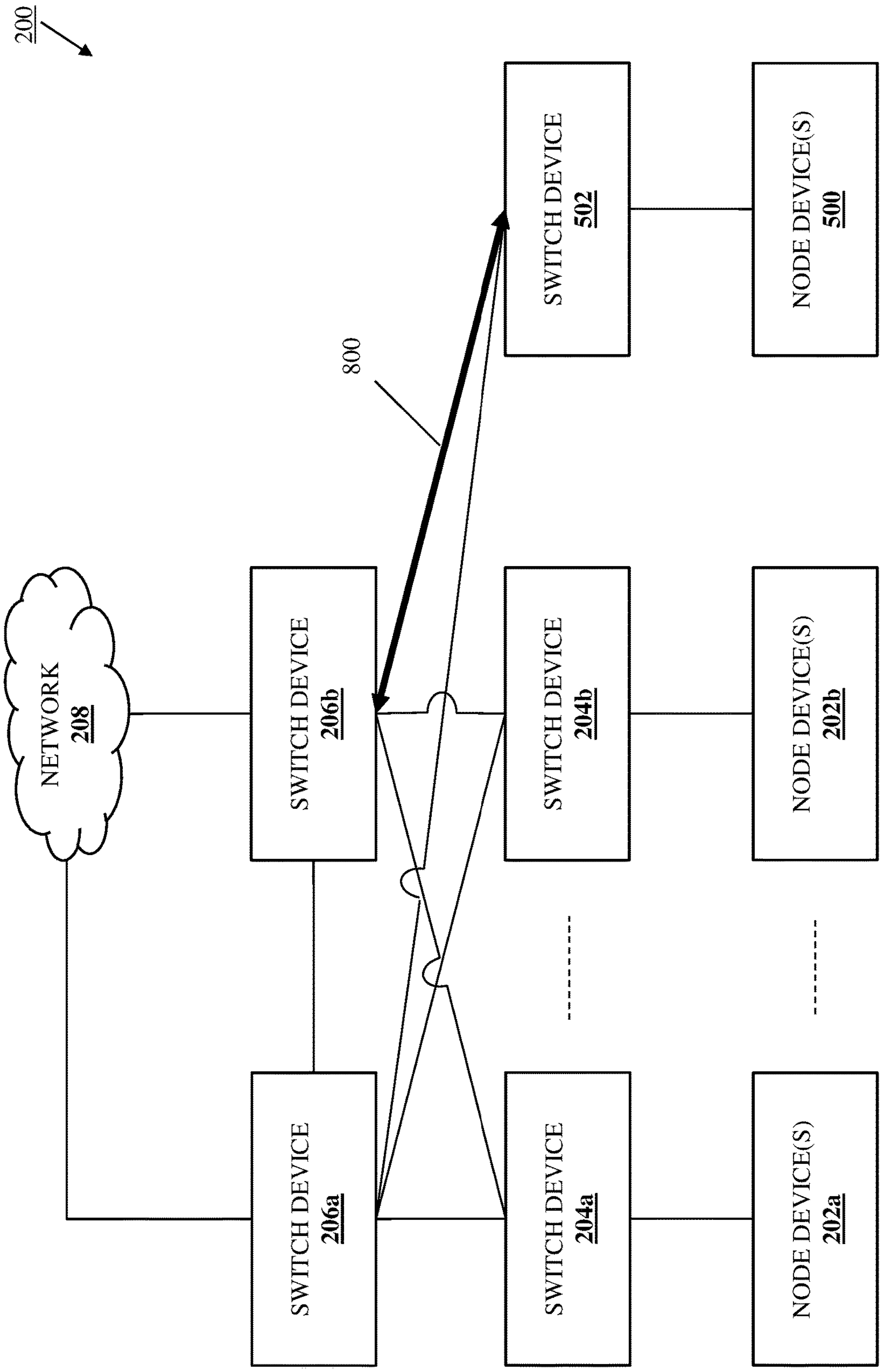
FIG. 8B is a schematic view illustrating an embodiment of the modified switch fabric of FIG. 5 operating during the method of FIG. 4.

If, at decision block 404, it is determined that the second switch device/switch fabric connectivity is verified, the method 400 proceeds to decision block 408 where it is determined whether the second switch device will degrade a switch fabric data transmission bandwidth. With reference to FIGS. 8A and 8B, in an embodiment of decision block 408, the switch fabric modification engine 304 in the "primary" switch device 206*b*/300 may perform switch device/switch fabric data transmission degradation determination operations 800 that include determining, via its communication system 308, whether the addition of the switch device 502 to the switch fabric provided by the networked system 200 will degrade a switch fabric data transmission bandwidth of the switch fabric. For example, the switch device/switch fabric data transmission degradation determination operations 800 may include the switch fabric modification engine 304 determining a data transmission bandwidth of the switch fabric prior to the addition of the switch device 502 to the switch fabric, determining data transmission capabilities of the switch device 502, and then determining whether the data transmission capabilities of the switch device 502 will degrade the data transmission bandwidth of the switch fabric if the switch device 502 is added to the switch fabric.

For example, the switch device/switch fabric data transmission degradation determination operations 800 may include the switch fabric modification engine 304 in the "primary" switch device 206*b*/300 exchanging Link Layer Discovery Protocol (LLDP) communications with the switch device 502 that allow the switch fabric modification engine 304 to request and receive data transmission capability information from the switch device 502 (e.g., a maximum data transmission speed the switch device 502 is capable of, a number of port available for data transmission on the switch device 502, etc.), and one of skill in the art in possession of the present disclosure will appreciate how the switch fabric modification engine 304 may compare that data transmission capability information to a data transmission bandwidth of the switch fabric (e.g., an uplink/downlink bandwidth of the switch fabric that may have been previously measured during its operation) to determine whether the addition of the switch device 502 to the switch fabric will degrade its data transmission bandwidth (i.e., due to the data transmission capabilities of the switch device 502 being a threshold amount lower than the data transmission bandwidth of the switch fabric).

However, while specific examples of the determination of whether the addition of the switch device 502 to the switch fabric will degrade a switch fabric data transmission bandwidth of the switch fabric have been described, one of skill in the art in possession of the present disclosure will appreciate how the switch fabric data transmission bandwidth degradation may be determined using other techniques that will fall within the scope of the present disclosure as well. Furthermore, while not illustrated or described in detail, one of skill in the art in possession of the present disclosure will appreciate how a determination of whether the addition of the switch device 604 to the switch fabric discussed above with reference to FIG. 6 will degrade a switch fabric data transmission bandwidth of the switch fabric may be performed in a similar manner while remaining within the scope of the present disclosure as well.

If, at decision block 408, it is determined that the second switch device will degrade the switch fabric data transmission bandwidth, the method 400 proceeds to block 410 where the primary switch device provides a degraded switch fabric data transmission warning. In an embodiment of block 410 and in response to determining that the addition of the switch device 502 to the switch fabric will degrade the switch fabric data transmission bandwidth of the switch fabric, the switch fabric modification engine 304 in the "primary" switch device 206*b*/300 may generate and provide a degraded switch fabric data transmission warning for display to a network administrator or other user (e.g., the degraded switch fabric data transmission warning may be transmitted via the network 208 for display on a management device, not illustrated) that indicates that the addition of the switch device 502 to the switch fabric provided by the networked system 200 will degrade its data transmission bandwidth.

Furthermore, while not illustrated or described in detail, one of skill in the art in possession of the present disclosure will appreciate how the comparison of data transmission capability information of the switch device 502 to the data transmission bandwidth of the switch fabric allows for a determination of whether the data transmission capability of the switch device 502 exceeds the data transmission bandwidth of the switch fabric by more than a threshold amount. In such a situation, the switch fabric modification engine 304 in the "primary" switch device 206*b*/300 may generate and provide a switch device/switch fabric "mismatch" warning that may inform a network administrator or other user (e.g., the switch device/switch fabric "mismatch" warning may be transmitted via the network 208 for display on a management device, not illustrated) that the switch device 502 includes data transmission capabilities that greatly exceed the data transmission bandwidth of the switch fabric, and that may recommend connecting a relatively lower performance switch device to the switch fabric.

Furthermore, the method 400 is illustrated in FIG. 4A as ending in the event the addition of the second switch device to the switch fabric will degrade the data transmission bandwidth of the switch fabric, which one of skill in the art in possession of the present disclosure will appreciate may be appropriate in switch fabrics that require relatively high data transmission speeds. However, in other examples, the method 400 may continue to decision block 412 as discussed below even if the addition of the second switch device to the switch fabric will degrade the data transmission bandwidth of the switch fabric, which one of skill in the art in possession of the present disclosure will appreciate may be appropriate when the network administrator or other use is not concerned with the degradation of the data transmission bandwidth of the switch fabric caused by the addition of the second switch device to the switch fabric, or such data transmission bandwidth degradation is not critical.

Figure 9A:
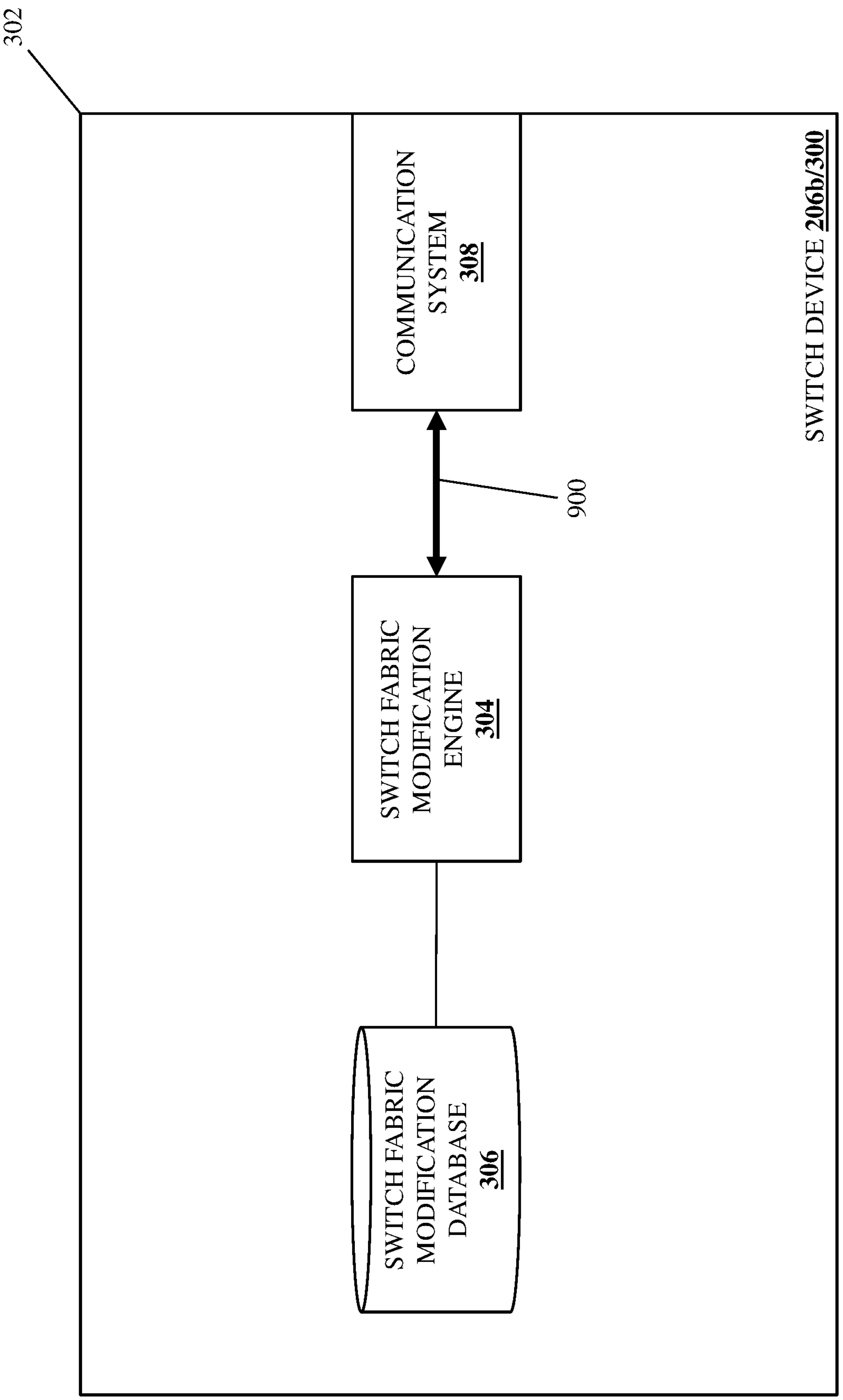
FIG. 9A is a schematic view illustrating an embodiment of the switch device of FIG. 3 operating during the method of FIG. 4.
Figure 9B:
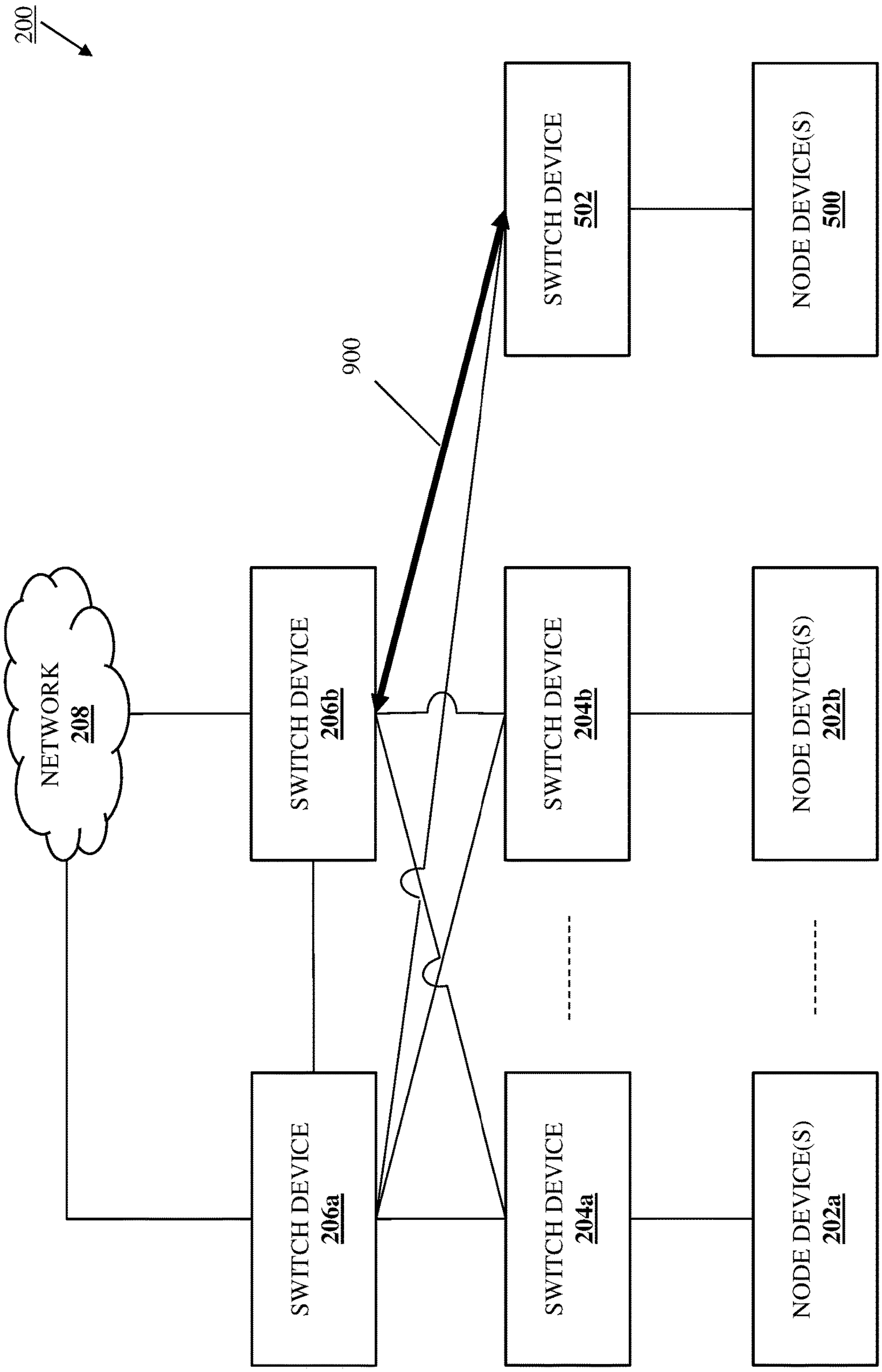
FIG. 9B is a schematic view illustrating an embodiment of the modified switch fabric of FIG. 5 operating during the method of FIG. 4.

If, at decision block 408, it is determined that the second switch device will not degrade the switch fabric data transmission bandwidth, the method 400 proceeds to decision block 412 where it is determined whether the second switch device will degrade a switch fabric data processing performance. With reference to FIGS. 9A and 9B, in an embodiment of decision block 412, the switch fabric modification engine 304 in the "primary" switch device 206*b*/300 may perform switch device/switch fabric data processing performance degradation determination operations 900 that include determining, via its communication system 308, whether the addition of the switch device 502 to the switch fabric provided by the networked system 200 will degrade a switch fabric data processing performance of the switch fabric. For example, the switch device/switch fabric data processing performance determination operations 900 may include the switch fabric modification engine 304 determining a data processing performance of the switch fabric prior to the addition of the switch device 502 to the switch fabric, determining data processing capabilities of the switch device 502, and then determining whether the data processing capabilities of the switch device 502 will degrade the data processing performance of the switch fabric if the switch device 502 is added to the switch fabric.

For example, the switch device/switch fabric data transmission degradation determination operations 800 may include the switch fabric modification engine 304 in the "primary" switch device 206*b*/300 exchanging LLDP communications (e.g., with "system_descr" or "system_cap" LLDP parameters) with the switch device 502 that allow the switch fabric modification engine 304 to request and receive data processing capability information from the switch device 502 (e.g., Central Processing Unit (CPU) capabilities of a CPU in the switch device 502, Network Processing Unit (NPU) capabilities of an NPU in the switch device 502, memory capabilities of memory in the switch device 502, etc.), and one of skill in the art in possession of the present disclosure will appreciate how the switch fabric modification engine 304 may compare that data processing capability information to a data processing performance of the switch fabric (e.g., total uplink bandwidth vs. total downlink bandwidth for the switch fabric, total number of available ports for connection to the switch fabric, the use of breakout device(s) that connects one port on switch device(s) in the switch fabric to multiple devices, and/or any of a variety of data processing characteristics of the switch fabric that may have been previously measured during its operation) to determine whether the addition of the switch device 502 to the switch fabric will degrade its data processing performance (i.e., due to the data processing capabilities of the switch device 502 being a threshold amount lower than the data processing performance of the switch fabric).

However, while specific examples of the determination of whether the addition of the switch device 502 to the switch fabric will degrade a switch fabric data processing performance of the switch fabric have been described, one of skill in the art in possession of the present disclosure will appreciate how the switch fabric data processing performance degradation may be determined using other techniques that will fall within the scope of the present disclosure as well. Furthermore, while not illustrated or described in detail, one of skill in the art in possession of the present disclosure in the art in possession of the present disclosure will appreciate how a determination of whether the addition of the switch device 604 to the switch fabric discussed above with reference to FIG. 6 will degrade a switch fabric data processing performance of the switch fabric may be performed in a similar manner while remaining within the scope of the present disclosure as well.

If, at decision block 412, it is determined that the second switch device will degrade a switch fabric data processing performance, the method 400 proceeds to block 414 where the primary switch device provides a degraded switch fabric data processing performance warning. In an embodiment, at block 414 and in response to determining that the addition of the switch device 502 to the switch fabric will degrade the switch fabric data processing performance of the switch fabric, the switch fabric modification engine 304 in the "primary" switch device 206*b*/300 may generate and provide a degraded switch fabric data processing performance warning for display to a network administrator or other user (e.g., the degraded switch fabric data processing performance warning may be transmitted via the network 208 for display on a management device, not illustrated) that indicates that the addition of the switch device 502 to the switch fabric provided by the networked system 200 will degrade its data processing performance.

Furthermore, while not illustrated or described in detail, one of skill in the art in possession of the present disclosure will appreciate how the comparison of data processing capability information of the switch device 502 to the data processing performance of the switch fabric allows for a determination of whether the data processing capability of the switch device 502 exceeds the data processing performance of the switch fabric by more than a threshold amount. In such a situation, the switch fabric modification engine 304 in the "primary" switch device 206*b*/300 may generate and provide a switch device/switch fabric "mismatch" warning that may inform a network administrator or other user (e.g., the switch device/switch fabric "mismatch" warning may be transmitted via the network 208 for display on a management device, not illustrated) that the switch device 502 includes data processing capabilities that greatly exceed the data processing performance of the switch fabric, and that may recommend connecting a relatively lower performance switch device to the switch fabric.

Furthermore, the method 400 is illustrated in FIG. 4A as ending in the event the addition of the second switch device to the switch fabric will degrade the data processing performance of the switch fabric, which one of skill in the art in possession of the present disclosure will appreciate may be appropriate in switch fabrics that require relatively high data processing speeds. However, in other examples, the method 400 may continue to decision block 412 as discussed below even if the addition of the second switch device to the switch fabric will degrade the data processing performance of the switch fabric, which one of skill in the art in possession of the present disclosure will appreciate may be appropriate when the network administrator or other use is not concerned with the degradation of the data processing performance of the switch fabric caused by the addition of the second switch device to the switch fabric, or such data processing performance degradation is not critical.

Figure 10A:
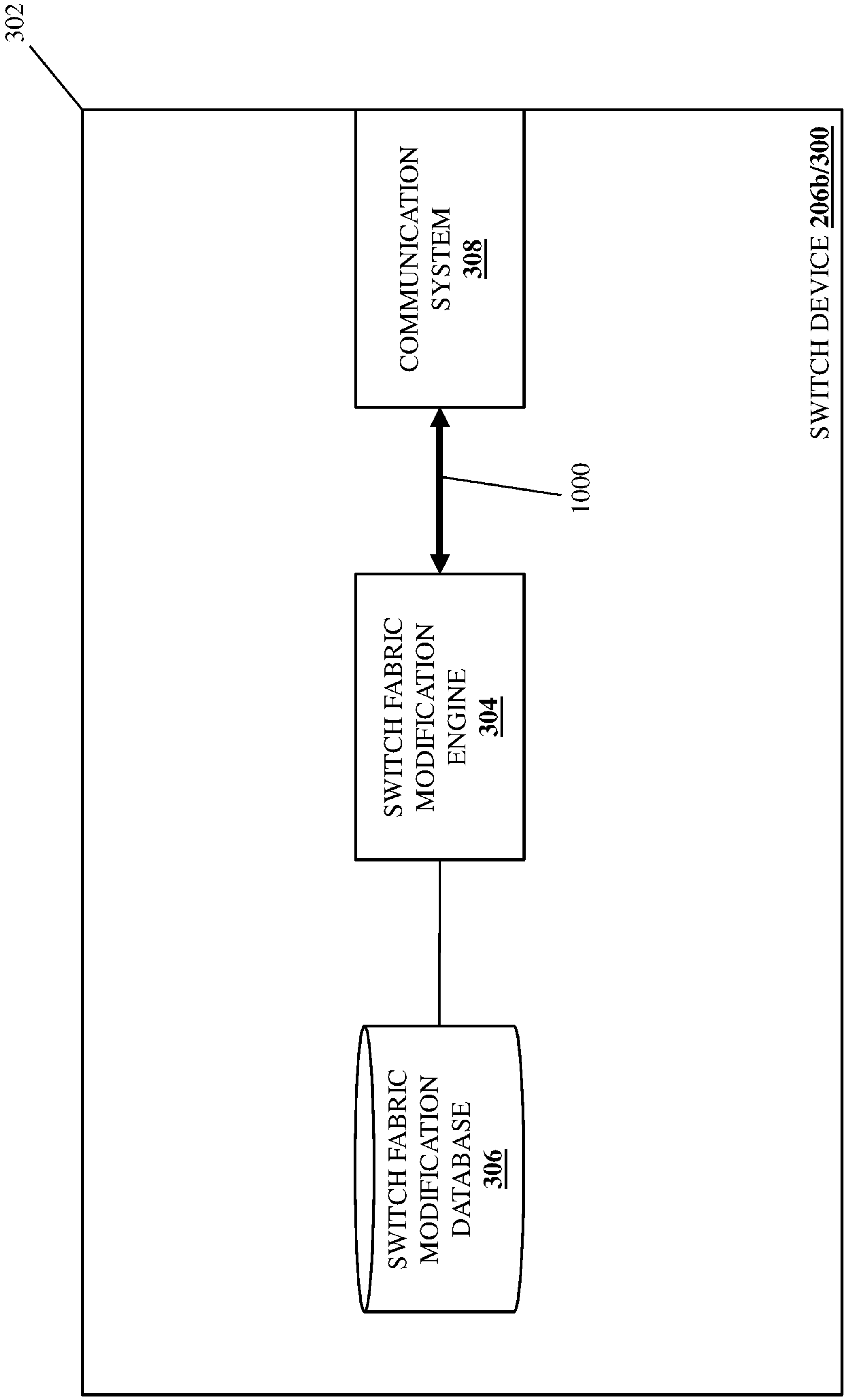
FIG. 10A is a schematic view illustrating an embodiment of the switch device of FIG. 3 operating during the method of FIG. 4.
Figure 10B:
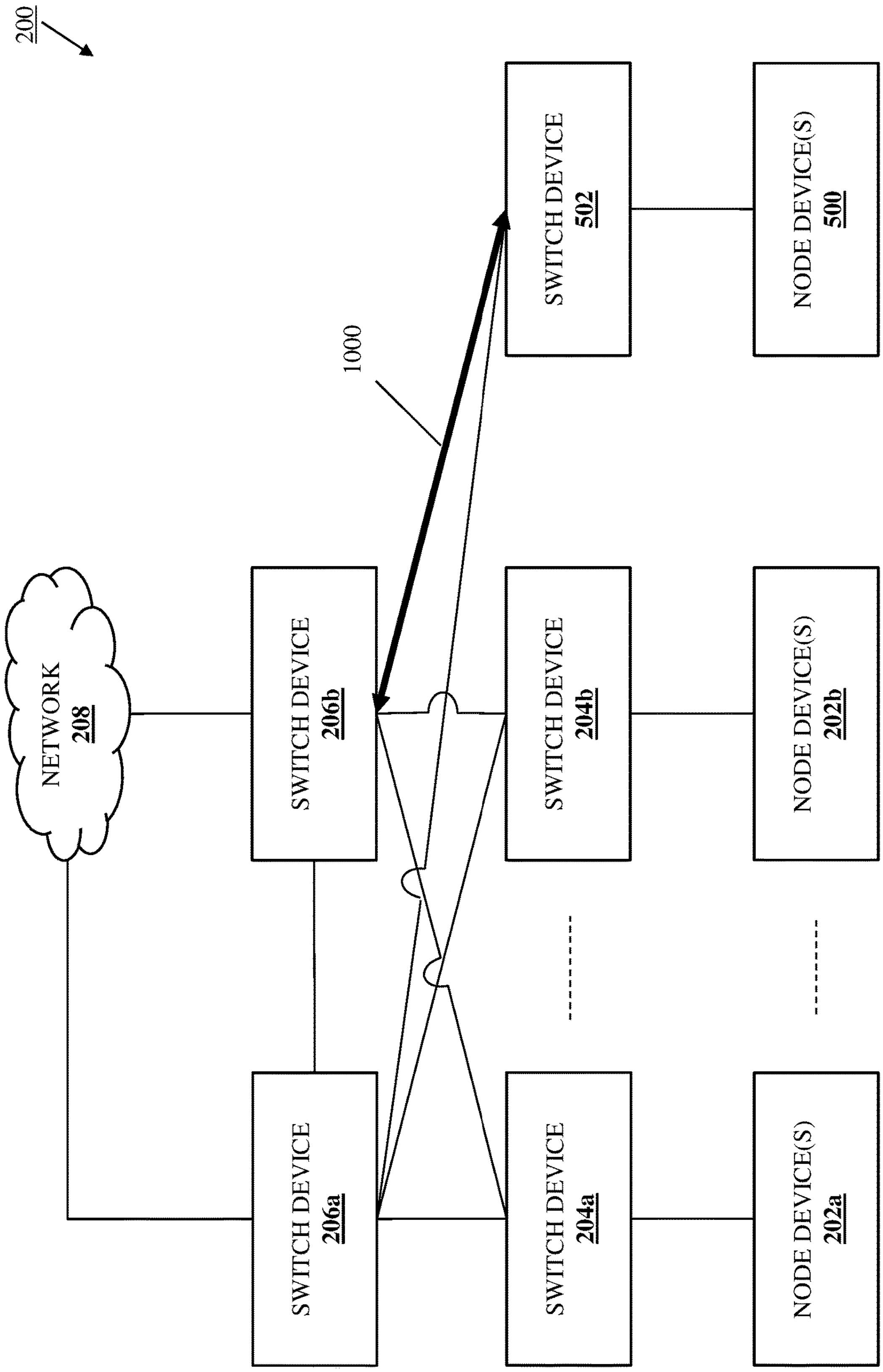
FIG. 10B is a schematic view illustrating an embodiment of the modified switch fabric of FIG. 5 operating during the method of FIG. 4.

If, at decision block 412, it is determined that the second switch device will not degrade the switch fabric processing performance, the method 400 proceeds to decision block 416 where the method 400 proceeds depending on whether a second switch device operating configuration is verified. With reference to FIGS. 10A and 10B, in an embodiment of decision block 416, the switch fabric modification engine 304 in the "primary" switch device 206*b*/300 may perform switch device operating configuration verification operations 1000 that include determining, via its communication system 308, whether the switch device 502 includes an operating configuration that matches the switch devices 204*a*-204*b* and 206*a*-206*b*. As will be appreciated by one of skill in the art in possession of the present disclosure, each of the switch devices in the switch fabric provided by the networked system 200 may require the same operating system version and same firmware version in order for the switch fabric to operate correctly, and thus the switch device/switch fabric data processing performance determination operations 900 may include the switch fabric modification engine 304 determining whether the switch device 502 includes the same operating system version and firmware version as the "primary" switch device 206*b* (which presumably has the same operating system version and firmware version as the other switch devices in the switch fabric provided by the networked system 200 if that switch fabric is operating correctly).

For example, the switch device operating configuration verification operations 1000 may include the switch fabric modification engine 304 in the "primary" switch device 206*b*/300 exchanging LLDP communications with the switch device 502 that allow the switch fabric modification engine 304 to request and receive operating configuration information from the switch device 502 (e.g., an operating system version provided on the switch device 502, a firmware version provided on the switch device 502, etc.), and one of skill in the art in possession of the present disclosure will appreciate how the switch fabric modification engine 304 may compare that operating configuration information to the operating configuration information for the switch fabric (e.g., the operating system version and firmware version being used by the "primary" switch device 206*b*) to determine whether the operating configuration information of the switch device 502 matches the operating configuration information of the switch fabric.

However, while specific examples of the determination of whether the operating configuration the switch device 502 matches the operating configuration of the switch fabric have been described, one of skill in the art in possession of the present disclosure will appreciate how the matching of operating system configurations may be determined using other techniques that will fall within the scope of the present disclosure as well. Furthermore, while not illustrated or described in detail, one of skill in the art in possession of the present disclosure in the art in possession of the present disclosure will appreciate how a determination of whether the operating configuration of the switch device 604 matches the operating configuration of the switch fabric discussed above with reference to FIG. 6 may be performed in a similar manner while remaining within the scope of the present disclosure as well.

Figure 10C:
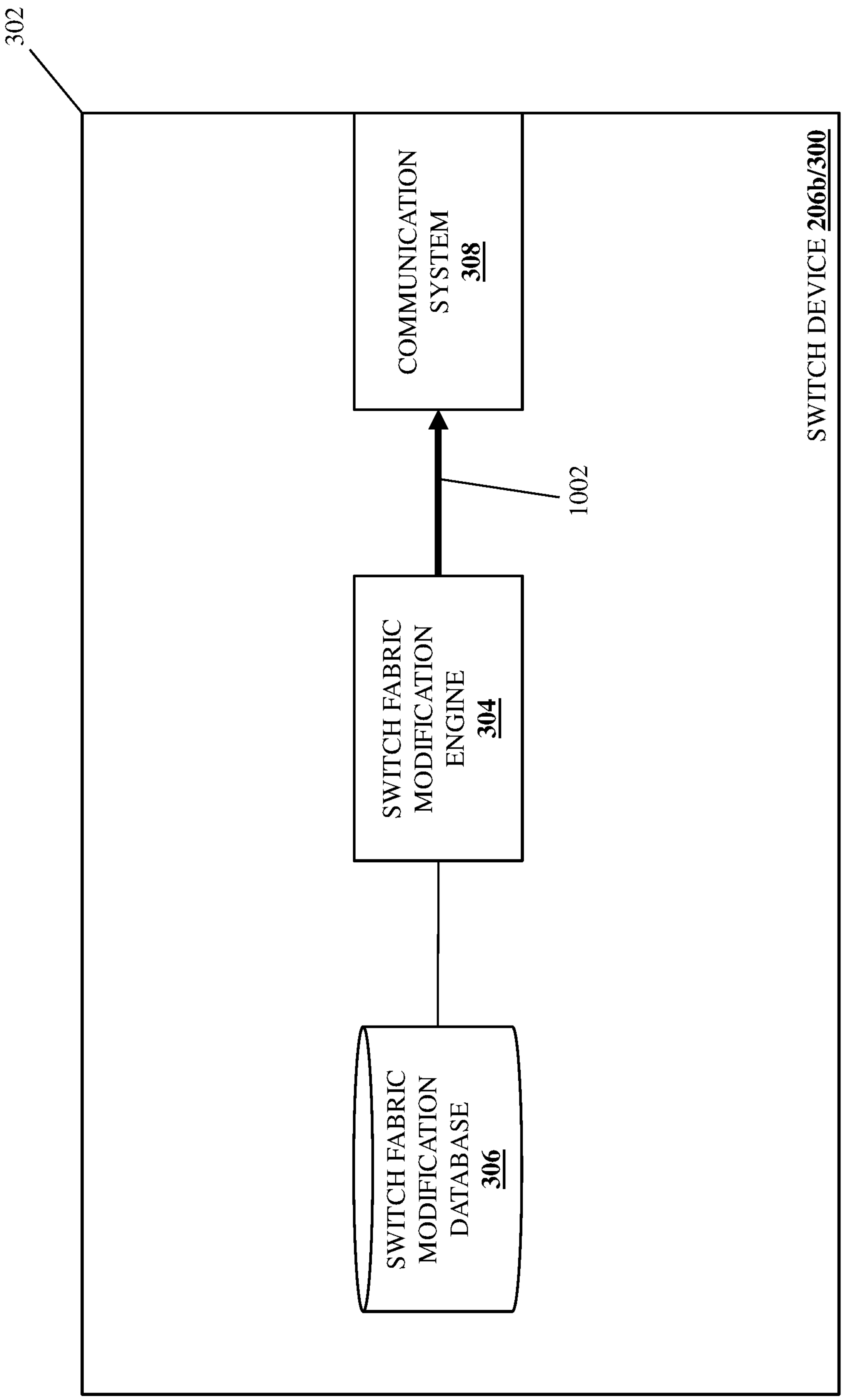
FIG. 10C is a schematic view illustrating an embodiment of the switch device of FIG. 3 operating during the method of FIG. 4.
Figure 10D:
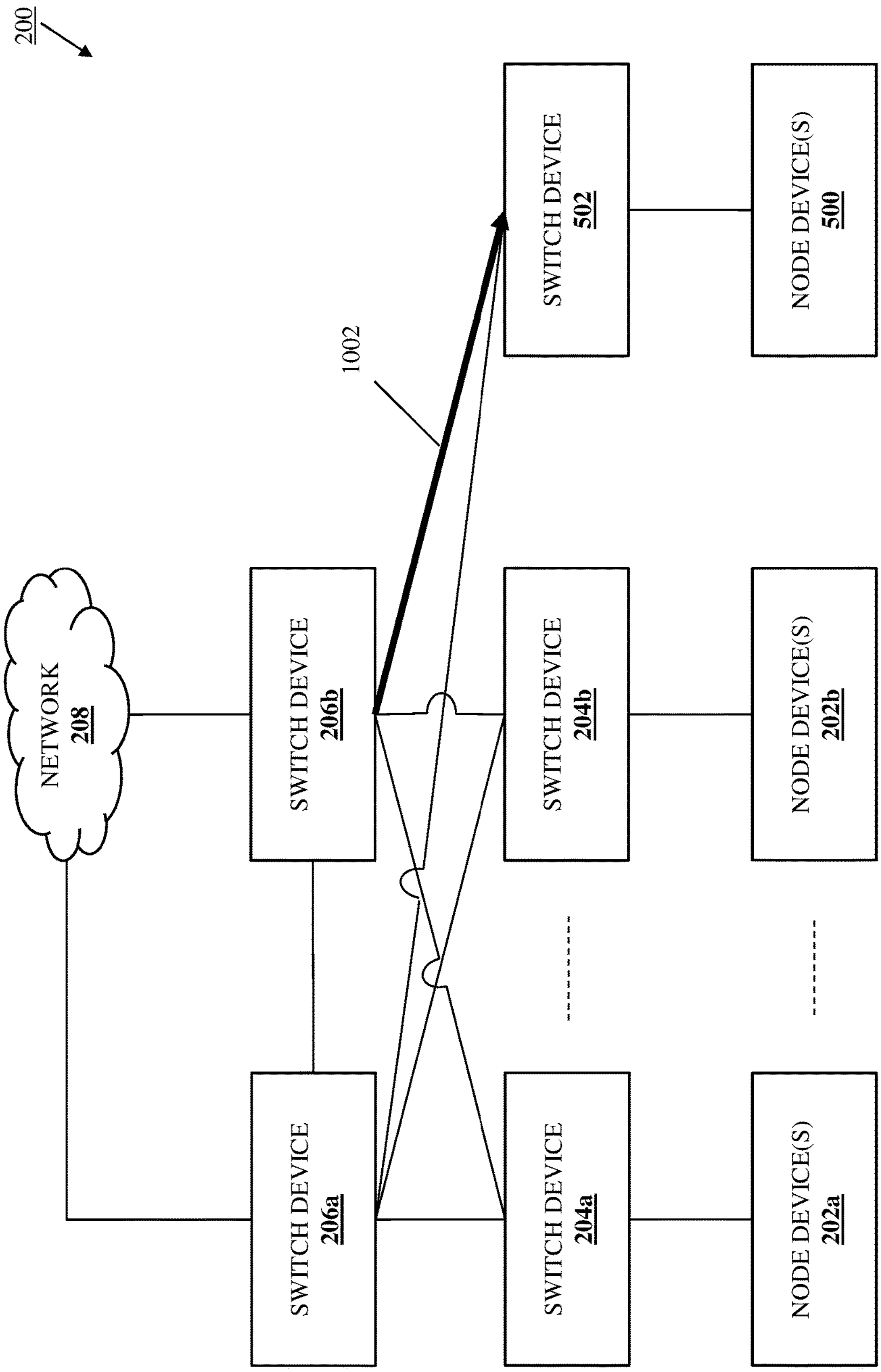
FIG. 10D is a schematic view illustrating an embodiment of the modified switch fabric of FIG. 5 operating during the method of FIG. 4.

If, at decision block 416, the second switch device operating configuration is not verified, the method 400 proceeds to block 418 where the primary switch device provides for modification to the operating configuration of the second switch device. With reference to FIG. 10C, in an embodiment of block 418 and in response to determining that the operating configuration of the switch device 502 does not match the operating configuration of the switch fabric, the switch fabric modification engine 304 in the "primary" switch device 206*b*/300 may perform operating configuration modification operations 1002 that may include attempting to modify an operating configuration on the switch device 502 to match the operating configuration of the "primary" switch device 206*a*/300 and, thus, the switch fabric provided by the networked system 200.

For example, the operating configuration modification operations 1002 performed by the switch fabric modification engine 304 in the "primary" switch device 206*b*/300 may include providing an operating system version, a firmware version, and/or other operating configuration on the switch device 502 (e.g., whichever did not match that of the "primary" switch device/switch fabric) for installation, and one of skill in the art in possession of the present disclosure will appreciate how such operating configurations may be retrieved by the switch fabric modification engine 304 from its switch fabric modification database 306, via the network 208, and/or in a variety of manners that would be apparent to one of skill in the art in possession of the present disclosure. Furthermore, while not illustrated or described in detail, one of skill in the art in possession of the present disclosure will appreciate how an operating configuration that matches that of the "primary" switch device/switch fabric may be provided for installation on the switch device 604 of FIG. 6 in a similar manner while remaining within the scope of the present disclosure as well.

The method 400 then proceeds to decision block 420 where the method 400 proceeds depending on whether the second switch device operating configuration modification was successful. In an embodiment, at decision block 420 and subsequent to providing the operating configuration that matches that of the "primary" switch device/switch fabric for installation on the switch device 502, the switch fabric modification engine 304 in the "primary" switch device **206*b*/300 may instruct the switch device 502 to install that operating configuration, and then may monitor the installation of that operating configuration. As such, one of skill in the art in possession of the present disclosure will appreciate how the switch fabric modification engine 304 may determine whether the installation of the operating configuration by the switch device 502** was successful using a variety of operating configuration installation monitoring techniques known in the art.

If, at decision block 420, the second switch device operating configuration modification was not successful, the method 400 proceeds to block 422 where the primary switch device rolls back modifications to the second switch device and provides an operating configuration upgrade failure warning. In an embodiment, at block 422 and in response to determining that the installation of the operating configuration by the switch device 502 was unsuccessful, the switch fabric modification engine 304 in the "primary" switch device **206*b*/300 may "roll back" the operating configuration of the switch device 502 (e.g., in order to provide the switch device 502 with the operating configuration that was determined to not match that of the of the "primary" switch device/switch fabric at decision block 416) using any of a variety of operating configuration rollback techniques that would be apparent to one of skill in the art in possession of the present disclosure, and may generate and provide an operating configuration installation failure warning for display to a network administrator or other user (e.g., the operating configuration installation failure warning may be transmitted via the network 208 for display on a management device, not illustrated) that indicates that the attempt to modify the operating configuration if the switch device 502 to match that of the switch fabric has failed, and that the switch device 502 cannot be added to the switch fabric. Furthermore, while not illustrated or described in detail, one of skill in the art in possession of the present disclosure will appreciate how a failure to modify the operating configuration of the switch device 604 of FIG. 6** to match that of the "primary" switch device/switch fabric may be dealt with in a similar manner while remaining within the scope of the present disclosures as well.

If at decision block 416 the second switch device operating configuration is verified, or if at decision block 420 the second switch device operating configuration modification was successful, the method 400 proceeds to block 424 where the primary switch device adds the second switch device to the switch fabric. In an embodiment, at block 424 and in response to either the verification of the operating configuration of the switch device 502 or the modification of the operating configuration of the switch device 502 to match that of the switch fabric, the switch fabric modification engine 304 in the "primary" switch device **206*b*/300 may add the switch device 502 to the switch fabric provided by the networked system 200 using any of a variety of switch device/switch fabric adding techniques that would be apparent to one of skill in the art in possession of the present disclosure. As such, one of skill in the art in possession of the present disclosure will appreciate how following block 424, the switch device 502 may operate as part of the switch fabric provided by the networked system 200 to transmit data communications between the node devices 202*a*-202*b* and 500 and devices connected to the network 208**.

However, while the method 400 describes the verification of switch device/switch fabric connectivity and switch device operating configuration, as well as checks to determine whether the switch fabric data transmission bandwidth or the switch fabric processing performance will be degraded, one of skill in the art in possession of the present disclosure will appreciate how other verifications and/or checks may be performed during the method 400 while remaining within the scope of the present disclosure as well. For example, the switch fabric modification engine 304 in the "primary" switch device **206*b*/300 may verify a switch device security configuration of the switch device 502/604 by determining whether the switch device 502/604 includes a security configuration that matches the switch devices 204*a*-204*b* and 206*a*-206*b*, which may include retrieving a security configuration from the switch device 502/604 (e.g., via LLDP communications similarly as described above), determining whether that security configuration matches the security configuration of the "primary" switch device 206*b*/300 and, if not, attempting to upgrade that security configuration (e.g. similarly to the operating configuration upgrade described at blocks 418, 420, and 422). As such, a variety of verifications and/or checks may be performed during the method 400** while remaining within the scope of the present disclosure.

Thus, systems and methods have been described that automate modifications to a switch fabric such as the addition or replacement of a switch device in that switch fabric. For example, the switch fabric modification system of the present disclosure may include a switch fabric having first switch devices and a primary switch device. The primary switch device detects a second switch device has been connected to the switch fabric and, in response and without subsequently receiving an instruction from a user, verifies a second switch device/switch fabric connectivity of the second switch device to the switch fabric that provides a switch device role for the second switch device by determining that the second switch device/switch fabric connectivity enables data communications that are available to the first switch device(s) that have the switch device role, verifies an operating configuration of the second switch device by determining that it matches an operating configuration of the primary switch device and, response to verifying the second switch device/switch fabric connectivity and the operating configuration of the second switch device, adds the second switch device to the switch fabric. As will be appreciated by one of skill in the art in possession of the present disclosure, the systems and methods described herein allow switch devices to be added or replaced in a switch fabric in an automated manner while maintaining the health and performance of the switch fabric.

Figure 11:
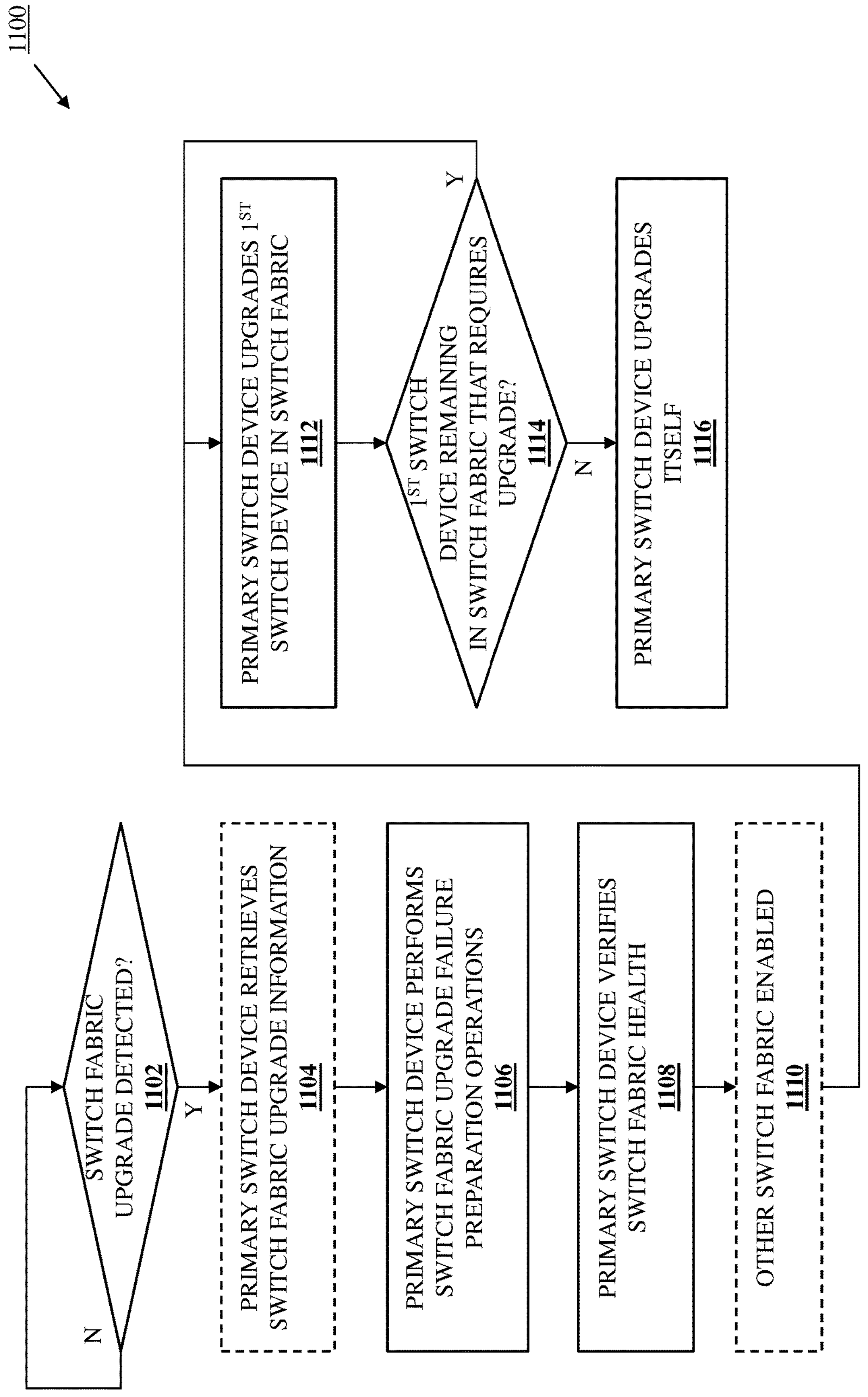
FIG. 11 is a flow chart illustrating an embodiment of a method for modifying a switch fabric.

Referring now to FIG. 11, an embodiment of a method 1100 for modifying a switch fabric is illustrated. As discussed below, the systems and methods of the present disclosure automate modifications to a switch fabric such as the upgrade of an operating configuration of a switch fabric. For example, the switch fabric modification system of the present disclosure may include a switch fabric having first switch devices and a primary switch device. The primary switch device detects an upgrade for the switch fabric and, in response and without subsequently receiving an instruction from a user, retrieves switch fabric upgrade information, performs switch fabric upgrade failure preparation operations, verifies a switch fabric health, optionally enables an other switch fabric, and then upgrades an operating configuration for each of the first switch devices in the switch fabric, followed by upgrading its own operating configuration. As will be appreciated by one of skill in the art in possession of the present disclosure, the systems and methods described herein allow a switch fabric to be upgraded in an automated manner while maintaining the health and performance of the switch fabric.

The method 1100 begins at decision block 1102 where it is determined whether a switch fabric upgrade is detected. In an embodiment, during or prior to the method 1100, one of the switch devices in the switch fabric provided by the networked system 200 may operate as a "primary" switch device that operates to manage the automatic switch fabric modification operations described below. For example, the primary switch device may be designated by a network administrator or other user of the switch fabric, may be nominated by the switch devices in the switch fabric using any of a variety of primary device nomination techniques (e.g., by determining the switch device in the switch fabric with the "lowest" switch device identifier") that would be apparent to one of skill in the art in possession of the present disclosure, and or may be provided in any of a variety of manners that would be apparent to one of skill in the art in possession of the present disclosure. In the specific examples below, the switch device 206*b* (e.g., a spine switch device in the embodiments illustrated in FIGS. 5 and 6) provides the primary switch device, but one of skill in the art in possession of the present disclosure will appreciate how any of the switch devices in the switch fabric provided by the networked system 200 may provide the primary switch device while remaining within the scope of the present disclosure as well.

In an embodiment, at decision block 1102, the switch fabric modification engine 304 in the "primary" switch device 206*b*/300 may monitor to detect whether a switch fabric upgrade exists for the switch fabric provided by the networked system 200. In some examples, a network administrator or other user may configure the switch fabric in an "upgrade" mode that instructs a switch fabric upgrade for the switch fabric, and may identify a switch fabric operating configuration for use in that switch fabric upgrade, and the switch fabric modification engine 304 may be configured to monitor or and/or otherwise detect that "upgrade" mode (e.g., in its switch fabric modification database 306, in a database that is accessible via the network 208, etc.). In other examples, at decision block 1102, the switch fabric modification engine 304 in the "primary" switch device 206*b*/300 may monitor for the presence of a switch fabric operating configuration in a location that is designated for storing switch fabric operating configuration upgrades for the switch fabric provided by the networked system 200 (e.g., in its switch fabric modification database 306, in a database that is accessible via the network 208, etc.), with the detection of the presence of that switch fabric operating configuration in that location resulting in the automatic upgrade operations discussed below that may be performed without subsequently receiving an instruction from a network administrator or other user. However, while specific examples of the detection of a switch fabric upgrade have been described, one of skill in the art in possession of the present disclosure will appreciate how switch fabric upgrades may be detected in a variety of manners that will fall within the scope of the present disclosure as well.

If, at decision block 1102, it is determined that a switch fabric upgrade is not detected, the method 1100 returns to decision block 1102. As such, the method 1100 may loop such that the switch fabric modification engine 304 in the "primary" switch device 206*b*/300 continues to monitor for a switch fabric upgrade for the switch fabric provided by the networked system 200 until such a switch fabric upgrade is detected.

Figure 12A:
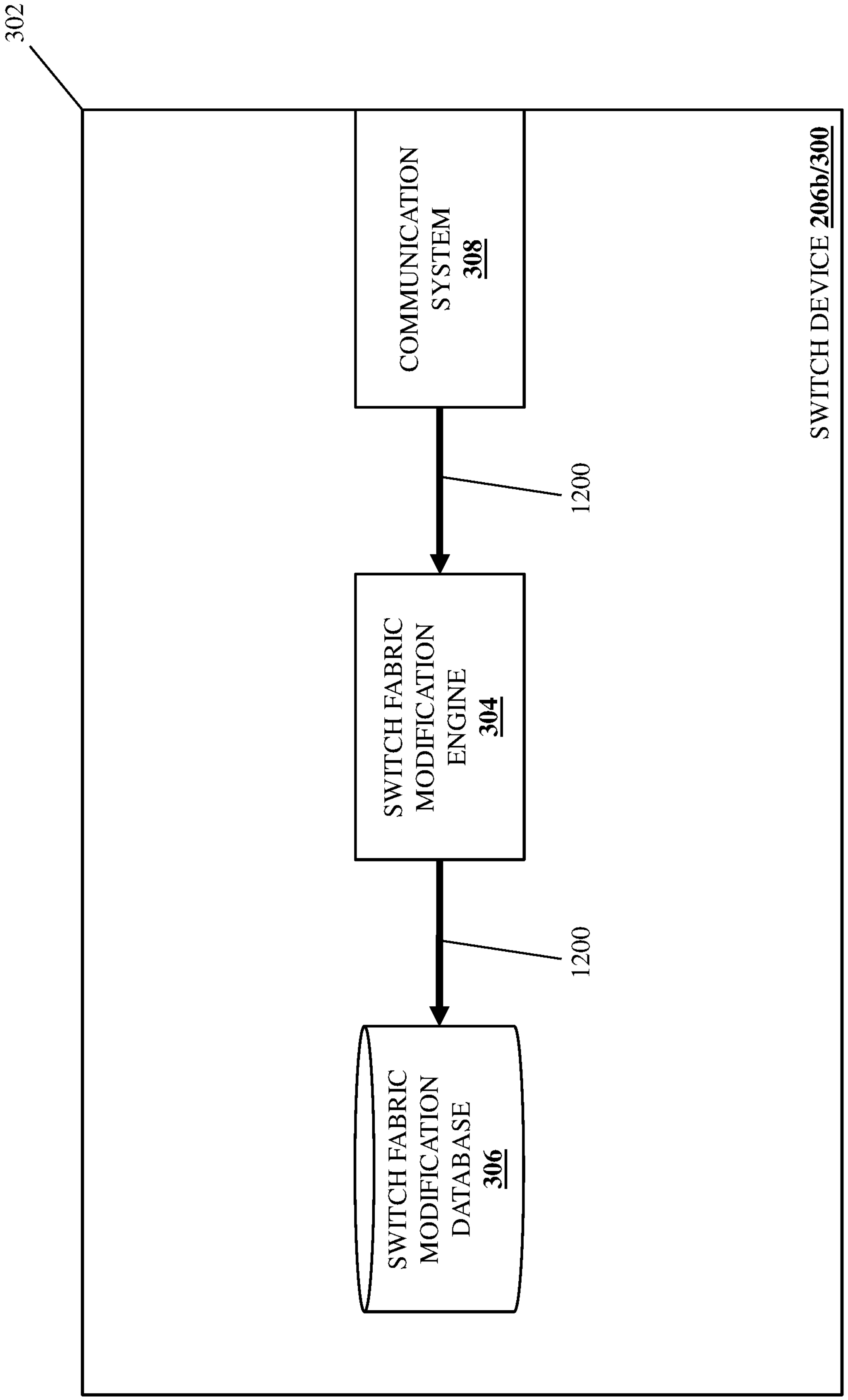
FIG. 12A is a schematic view illustrating an embodiment of the switch device of FIG. 3 operating during the method of FIG. 11.
Figure 12B:
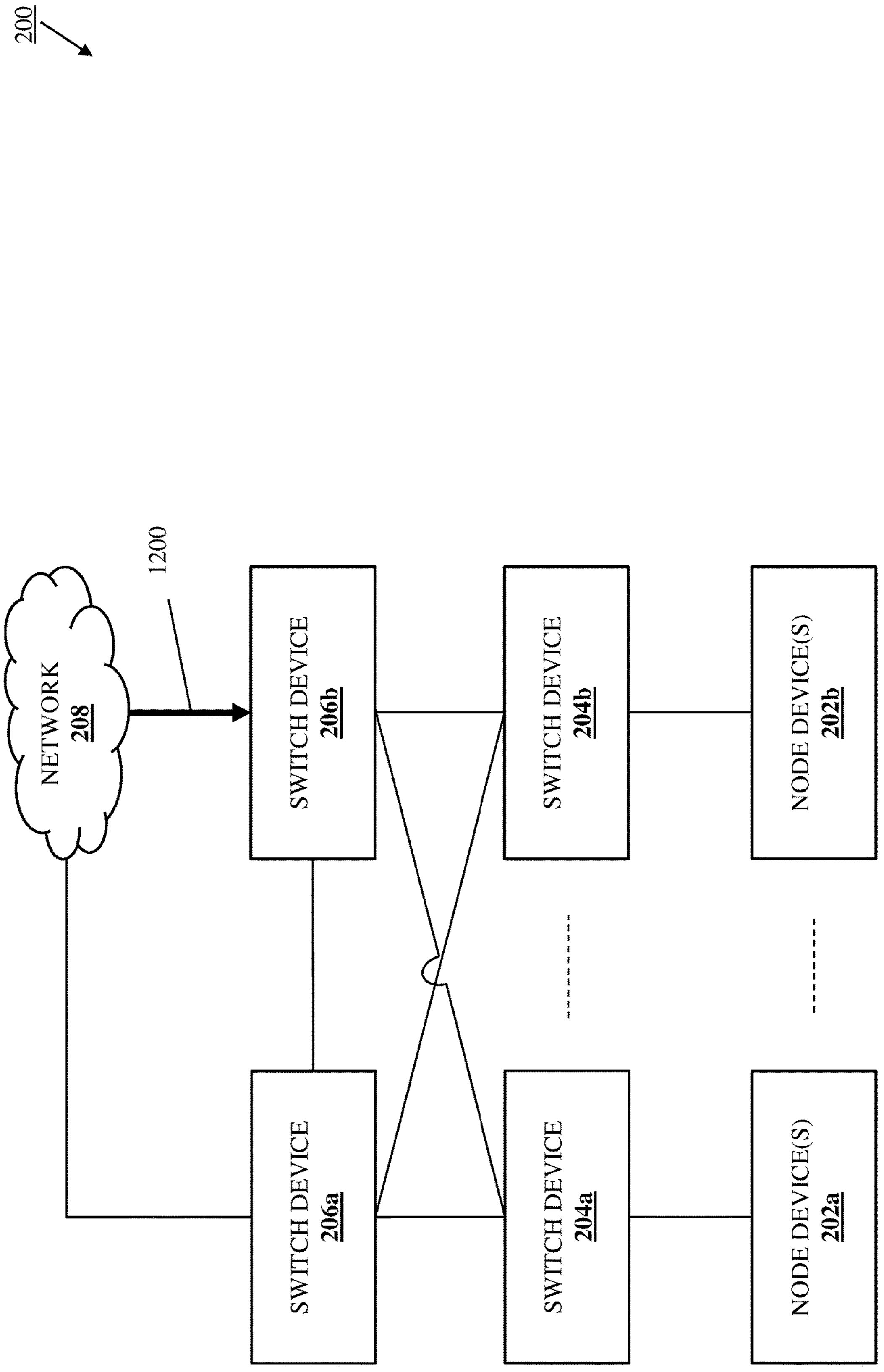
FIG. 12B is a schematic view illustrating an embodiment of the switch fabric of FIG. 2 operating during the method of FIG. 11.

If, at decision block 1102, it is determined that a switch fabric upgrade is detected, the method 1100 may proceed to optional block 1104 where the primary switch device retrieves switch fabric upgrade information. With reference to FIGS. 12A and 12B, in an embodiment of optional block 1104, the switch fabric modification engine 304 in the "primary" switch device 206*b*/300 may perform switch fabric upgrade information retrieval operations 1200 that, in the illustrated example, may include identifying switch fabric upgrade information (e.g., the switch fabric operating configuration identified by the network administrator or other user for use in the switch fabric upgrade discussed above), retrieving that switch fabric upgrade information (e.g., operating system upgrade information for an operating system version that will be provided on switch devices in the switch fabric as part of the switch fabric upgrade, firmware upgrade information for a firmware version that will be provided on switch devices in the switch fabric as part of the switch fabric upgrade, and/or other switch fabric upgrade information that would be apparent to one of skill in the art in possession of the present disclosure) through the network 208 via its communication system 308, and storing that switch fabric upgrade information in its switch fabric modification database 306. However, while illustrated and described as being retrieved via the network 208, one of skill in the art in possession of the present disclosure will appreciate how the switch fabric upgrade information may have previously been provided in the switch fabric modification database 306 of the "primary" switch device 206*b*/300 (e.g., by the network administrator or other user), and thus how optional block 1104 may be skipped in some embodiments.

The method 1100 then proceeds to block 1106 where the primary switch device performs switch fabric upgrade failure preparation operations. In an embodiment, at block 1106, the switch fabric modification engine 304 in the "primary" switch device 206*b*/300 may perform a variety of operations that one of skill in the art in possession of the present disclosure will appreciate prepare for the possibility of a failure of the switch fabric upgrade discussed below. For example, at block 1106 the switch fabric modification engine 304 may perform switch fabric topology identification operations that provide for the discovery, "pulling", or other identification of a topology of the switch fabric provided by the networked system 200 (i.e., a topology of the cluster of switch devices 204-204*b* and 206*a*-206*b* that provide the switch fabric), as well as the storage of any associated switch fabric topology information in its switch fabric modification database 306. In another example, at block 1106 the switch fabric modification engine 304 may perform backup operations that generate any of a variety of switch fabric backup information that one of skill in the art in possession of the present disclosure would recognize as providing for the switch fabric "rollback" functionality described below. However, while two specific examples have been provided, one of skill in the art in possession of the present disclosure will appreciate how other switch fabric upgrade failure preparation operations will fall within the scope of the present disclosure as well.

The method 1100 then proceeds to block 1108 where the primary switch device verifies a switch fabric health. In an embodiment, at block 1108, the switch fabric modification engine 304 in the "primary" switch device 206*b*/300 may perform a variety of operations that one of skill in the art in possession of the present disclosure will appreciate may operate to verify the health of the switch fabric provided by the networked system 200. For example, at block 1108 the switch fabric modification engine 304 may perform switch fabric connectivity verification operations that are similar to those described above with reference to block 404 of the method 400, but with the exception that the connectivity of each of the switch devices in the switch fabric may be verified, and with any connectivity issues resulting in a switch device/switch fabric connectivity warning similar to that described above with reference to block 406. In another example, at block 1108 the switch fabric modification engine 304 may perform switch fabric data transmission bandwidth degradation determination operations that are similar to those described above with reference to block 408 of the method 400, but with the exception that the degradation of the switch fabric data transmission bandwidth by any of the switch devices in the switch fabric may be determined (i.e., by determining whether the data transmission bandwidth of the switch fabric was degraded by the operation of that switch device at some point), and with any switch fabric data transmission bandwidth degradation issues resulting in a switch fabric data transmission bandwidth degradation warning similar to that described above with reference to block 410.

In another example, at block 1108 the switch fabric modification engine 304 may perform switch fabric data processing performance degradation determination operations that are similar to those described above with reference to block 412 of the method 400, but with the exception that the degradation of the switch fabric data processing performance by any of the switch devices in the switch fabric may be determined (i.e., by determining whether the data processing performance of the switch fabric was degraded by the operation of that switch device at some point), and with any switch fabric data processing performance degradation issues resulting in a switch fabric data processing performance degradation warning similar to that described above with reference to block 410. In yet another example, at block 1108 the switch fabric modification engine 304 may perform switch device security configuration verification operations that are similar to those described above, but with the exception that the security configuration of any of the switch devices in the switch fabric may be determined, and with any switch device security configuration issues resulting in a switch device security configuration warning (as well as the performance of security configuration upgrade operations if required). However, while a variety of switch fabric health verification operations have been described, one of skill in the art in possession of the present disclosure will appreciate how the health of the switch fabric may be verified using other techniques that will fall within the scope of the present disclosure as well.

The method 1100 may then proceed to optional block 1110 where an other switch fabric may be enabled. In an embodiment, at optional block 1110 and when a switch fabric (other than the switch fabric being upgraded) is available and configured to do so, the switch fabric modification engine 304 in the "primary" switch device 206*b*/300 may include switch fabric "failover" operations that enable that other switch fabric to transmit data communications, disable the switch fabric being upgraded from transmitting data communications, and/or perform any of a variety of "failover" operations that would be apparent to one of skill in the art in possession of the present disclosure.

Figure 13A:
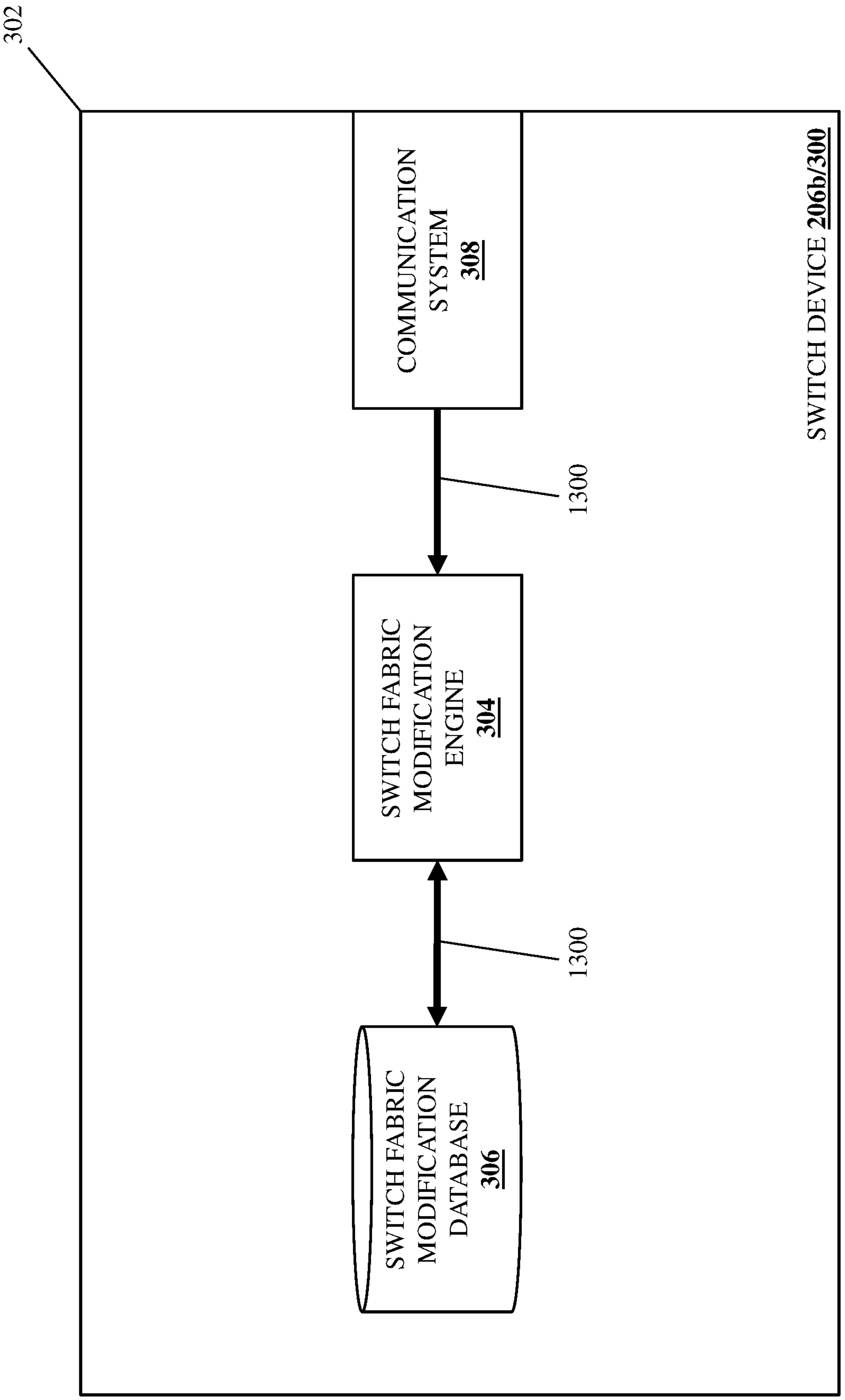
FIG. 13A is a schematic view illustrating an embodiment of the switch device of FIG. 3 operating during the method of FIG. 11.
Figure 13B:
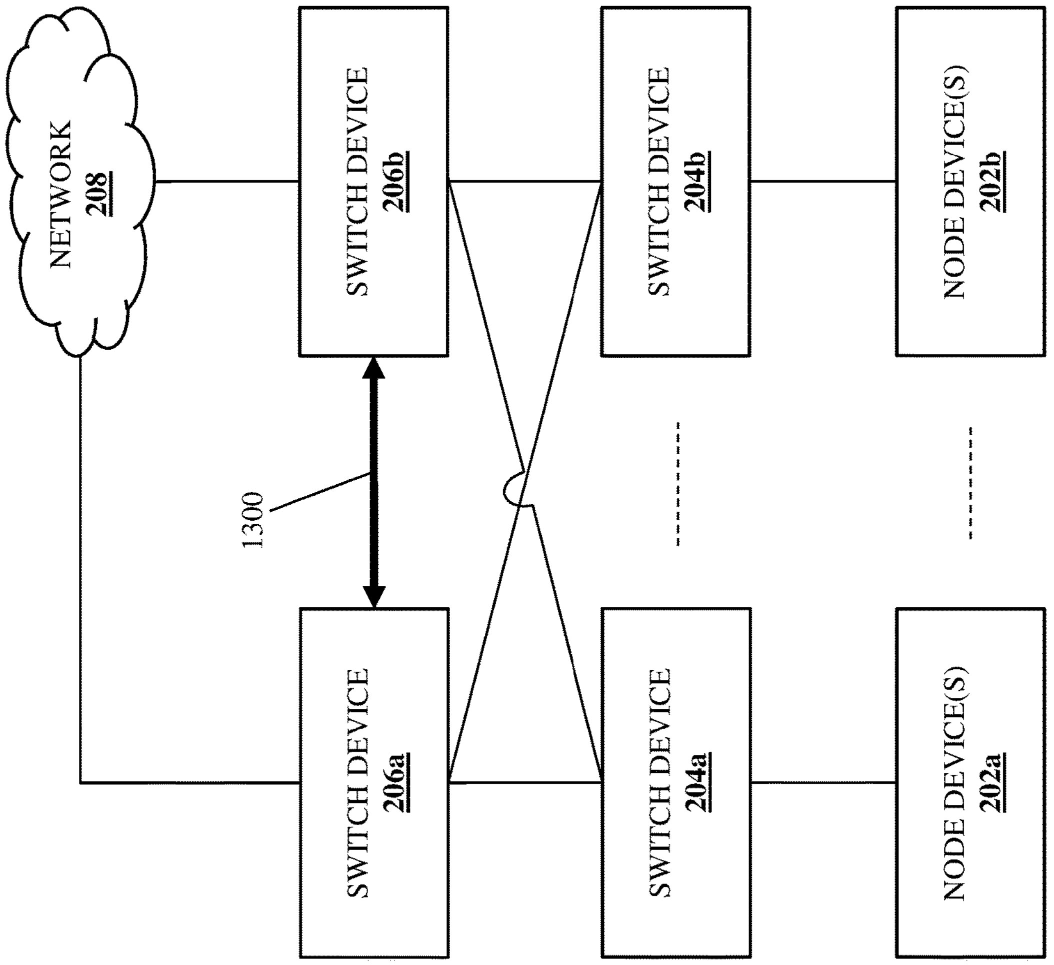
FIG. 13B is a schematic view illustrating an embodiment of the switch fabric of FIG. 2 operating during the method of FIG. 11.

The method 1100 then proceeds to block 1112 where the primary switch device upgrades a first switch device in the switch fabric. In an embodiment, at block 1112, the switch fabric modification engine 304 in the "primary" switch device 206*b*/300 may generate a switch fabric upgrade plan that may identify an order in which the switch devices in the switch fabric provided by the networked system 200 will be upgraded (e.g., a switch fabric upgrade plan may provide for the upgrading of spine switch devices before leaf switch devices), as well as any other switch fabric upgrade plan information that would be apparent to one of skill in the art in possession of the present disclosure. With reference to FIGS. 13A and 13B, in an embodiment of block 1112, the switch fabric modification engine 304 in the "primary" switch device 206*b*/300 may perform switch device upgrade operations 1300 that may include retrieving the switch fabric upgrade information (e.g., the operating system upgrade information for the operating system version, the firmware upgrade information for the firmware version, and/or other switch fabric upgrade information as discussed above) from its switch fabric modification database 306, providing that switch fabric upgrade information to the switch device 206*a* (which may be the first switch device designated for the switch fabric upgrade in the switch fabric upgrade plan discussed above), instructing the switch device 206*a* to install the operating system version and/or firmware version included in the switch fabric upgrade information, monitoring the installation of the operating system version and/or firmware version on the switch device 206*a*, and/or any other switch device upgrade operations that would be apparent to one of skill in the art in possession of the present disclosure.

While not illustrated or described in detail, in response to being instructed to install the operating system version and/or firmware version included in the switch fabric upgrade information, the switch device 206*a* will attempt to install that operating system version and/or firmware version, and the monitoring of the installation of the operating system version and/or firmware version on the switch device 206*a* by the switch fabric modification engine 304 in the "primary" switch device 206*b*/300 will allow the switch fabric modification engine 304 to determine whether that installation is successful or not. In the event the installation of the operating system version and/or firmware version on the switch device 206*a* is successful, the switch fabric modification engine 304 may mark the switch device 206*a* as "upgrade complete" (e.g., in its switch fabric modification database 306, in a database in the switch device 206*a*, etc.), and the method 1100 may proceed to decision block 1114. In the event the installation of the operating system version and/or firmware version on the switch device 206*a* is unsuccessful, the switch fabric modification engine 304 may perform the "rollback" operations described above to "rollback" the switch device 206*a* to the operation configuration it had prior to the attempted upgrade, perform some number of retries of the installation of the operating system version and/or firmware version on the switch device 206*a* and, if still unsuccessful, generate and provide a switch device upgrade failure warning for display to a network administrator or other user (e.g., the switch device upgrade failure warning may be transmitted via the network 208 for display on a management device, not illustrated).

The method 1100 then proceeds to decision block 1114 where the method 1100 proceeds depending on whether a first switch device is remaining in the switch fabric that requires an upgrade. In an embodiment, at decision block 1114 and in response to the successful upgrade of the switch device 206*a* in the switch fabric provided by the networked system 200, the switch fabric modification engine 304 in the "primary" switch device 206*b*/300 may determine whether additional switch devices exist in the switch fabric that require the upgrade. If, at decision block 1114, a first switch device is remaining in the switch fabric that requires an upgrade, the method 1100 returns to block 1112. As such, the method 1100 may loop such that, for each switch device remaining in the switch fabric provided by the networked system 200, the switch fabric modification engine 304 upgrades that switch device until there are no switch devices remaining in the switch fabric that require the upgrade.

Figure 14:
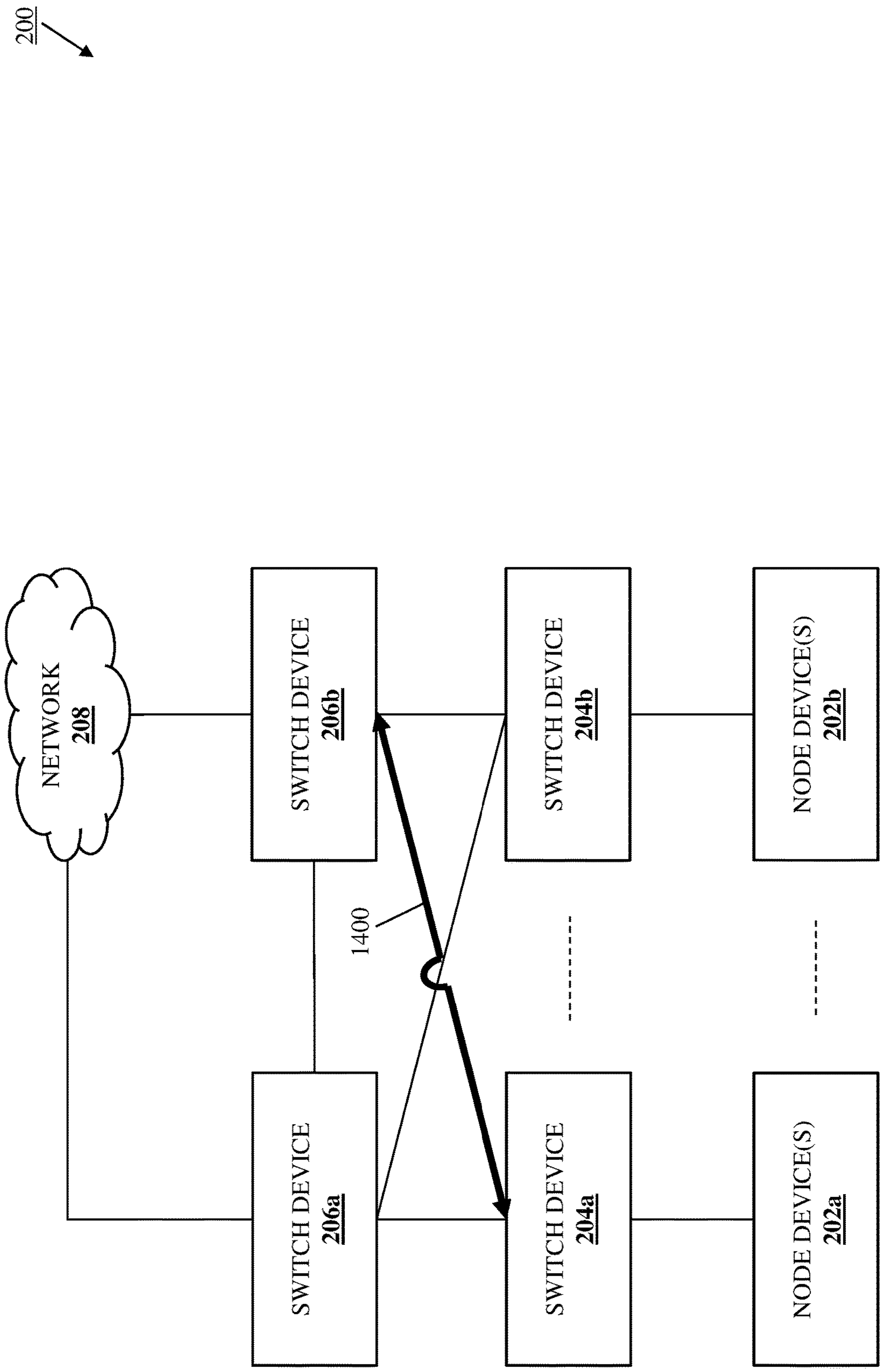
FIG. 14 is a schematic view illustrating an embodiment of the switch fabric of FIG. 2 operating during the method of FIG. 4.
Figure 15:
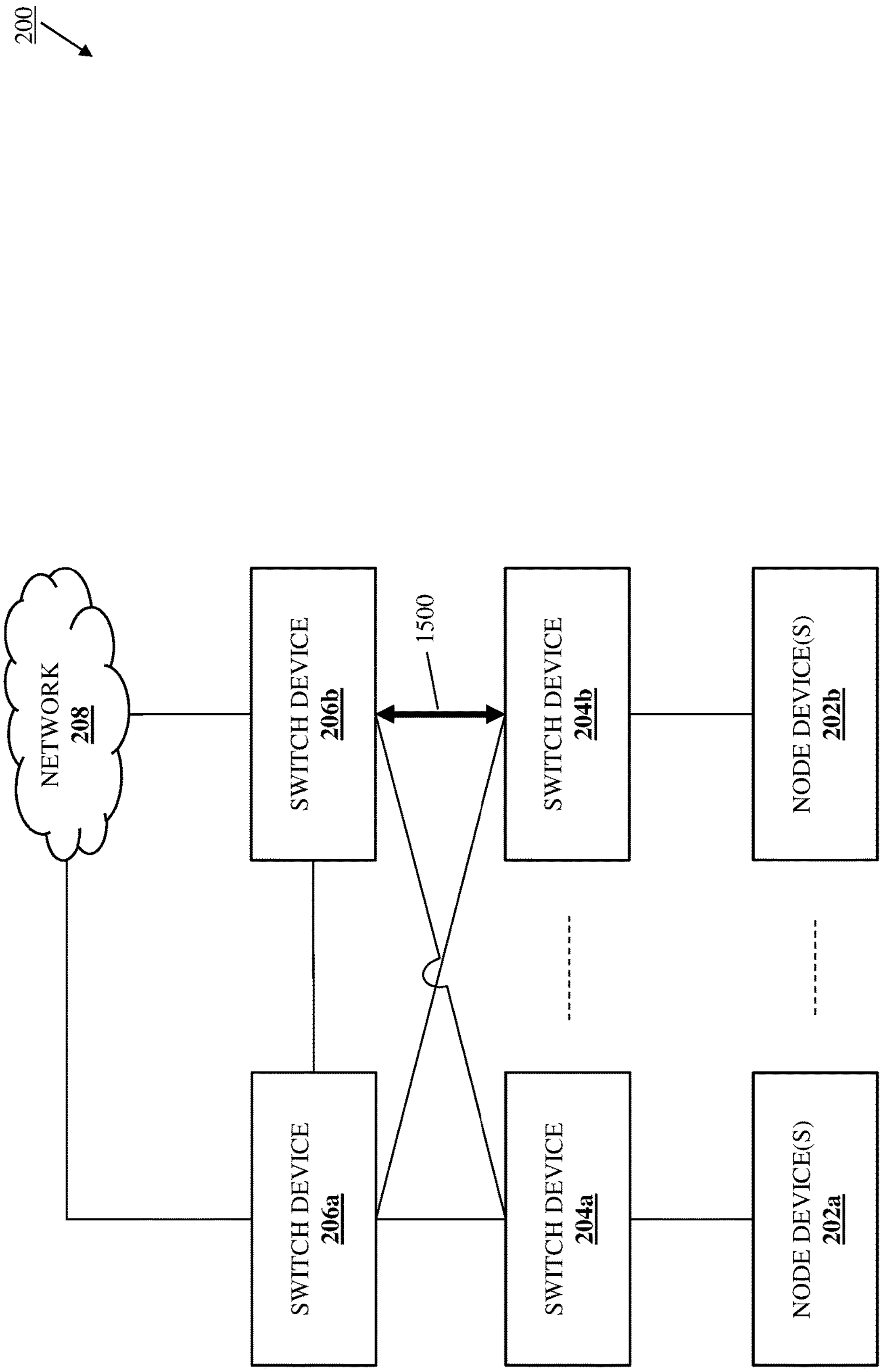
FIG. 15 is a schematic view illustrating an embodiment of the switch fabric of FIG. 2 operating during the method of FIG. 4.

As such, FIG. 14 illustrates how the "primary" switch device 206*b* may perform switch device upgrade operations 1400 that may include retrieving the switch fabric upgrade information (e.g., the operating system upgrade information for the operating system version, the firmware upgrade information for the firmware version, and/or other switch fabric upgrade information as discussed above), providing that switch fabric upgrade information to the switch device 204*a*, instructing the switch device 204*a* to install the operating system version and/or firmware version included in the switch fabric upgrade information, and monitoring the installation of the operating system version and/or firmware version on the switch device 204*a*, similarly as described above. Furthermore, FIG. 15 illustrates how the "primary" switch device 206*b* may perform switch device upgrade operations 1500 that may include retrieving the switch fabric upgrade information (e.g., the operating system upgrade information for the operating system version, the firmware upgrade information for the firmware version, and/or other switch fabric upgrade information as discussed above), providing that switch fabric upgrade information to the switch device 204*b*, instructing the switch device 204*b* to install the operating system version and/or firmware version included in the switch fabric upgrade information, and monitoring the installation of the operating system version and/or firmware version on the switch device 204*b*, similarly as described above.

If, at decision block 1114, a first switch device is not remaining in the switch fabric that requires an upgrade, the method 1100 proceeds to block 1116 where the primary switch device upgrades itself. In an embodiment, at block 1116 and in response to upgrading each of the switch devices in the switch fabric provided by the networked system 200 (i.e., other than itself), the switch fabric modification engine 304 in the "primary" switch device 206*b*/300 may select one of those switch devices to operate as the "primary" switch device, and then perform switch device upgrade operations that may include retrieving the switch fabric upgrade information (e.g., the operating system upgrade information for the operating system version, the firmware upgrade information for the firmware version, and/or other switch fabric upgrade information as discussed above) and performing the installation of the operating system version and/or firmware version included in the switch fabric upgrade information, with the new "primary" switch device monitoring the installation of the operating system version and/or firmware version on the switch device 206*b*, similarly as described above.

In some embodiments, following the updating of the switch device 206*b*, the new "primary switch device" may perform switch fabric "failover" operations that enable the upgraded switch fabric provided by the networked system 200 to transmit data communications, disable the other switch fabric that was enabled at optional block 1110 to transmit data communications, and/or perform any of a variety of "failover" operations that would be apparent to one of skill in the art in possession of the present disclosure. As such, one of skill in the art in possession of the present disclosure will appreciate how following block 1116, the upgraded switch fabric provided by the networked system 200 may operate to transmit data communications between the node devices 202*a*-202*b* and devices connected to the network 208.

Thus, systems and methods have been described that automate modifications to a switch fabric such as the upgrade of an operating configuration of a switch fabric. For example, the switch fabric modification system of the present disclosure may include a switch fabric having first switch devices and a primary switch device. The primary switch device detects an upgrade for the switch fabric and, in response and without subsequently receiving an instruction from a user, retrieves switch fabric upgrade information, performs switch fabric upgrade failure preparation operations, verifies a switch fabric health, optionally enables an other switch fabric, and then upgrades an operating configuration for each of the first switch devices in the switch fabric, followed by upgrading its own operating configuration. As will be appreciated by one of skill in the art in possession of the present disclosure, the systems and methods described herein allow a switch fabric to be upgraded in an automated manner while maintaining the health and performance of the switch fabric.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A switch fabric modification system, comprising:

a second switch device having a second switch device operating configuration that includes each of a second switch device operating system and second switch device firmware; and a switch fabric including a plurality of first switch devices, wherein a primary switch device that is one of the plurality of first switch devices included in the switch fabric s configured to:

detect that the second switch device has been connected to the switch fabric and, in response and without subsequently receiving an instruction from a user:

verify a switch fabric connectivity of the second switch device to the switch fabric that provides a switch device role for the second switch device by determining whether the switch fabric connectivity of the second switch device to the switch fabric enables data communications that are available to one or more of the plurality of first switch devices that also have the switch device role, wherein the switch device role is either a spine switch device role or a leaf switch device role;

verify the second switch device operating configuration of the second switch device by determining that the second switch device operating configuration matches a primary switch device operating configuration of the primary switch device that includes each of a primary switch device operating system and primary switch device firmware based on the second switch device operating system matching the primary switch device operating system and the second switch device firmware matching the primary switch device firmware; and add, in response to verifying the switch fabric connectivity of the second switch device to the switch fabric and the second switch device operating configuration of the second switch device, the second switch device to the switch fabric.

2. The system of claim 1, wherein the primary switch device is configured, in response to detecting that the second switch device has been connected to the switch fabric and without subsequently receiving an instruction from a user, to:

determine whether addition of the second switch device to the switch fabric will degrade a switch fabric data transmission bandwidth of the switch fabric; and provide, in response to determining that the addition of the second switch device to the switch fabric will degrade the switch fabric data transmission bandwidth of the switch fabric, a degraded switch fabric data transmission bandwidth warning.

3. The system of claim 1, wherein the primary switch device is configured, in response to detecting that the second switch device has been connected to the switch fabric and without subsequently receiving an instruction from a user, to:

determine whether addition of the second switch device to the switch fabric will degrade a switch fabric data processing performance of the switch fabric; and provide, in response to determining that the addition of the second switch device to the switch fabric will degrade the switch fabric data processing performance of the switch fabric, a degraded switch fabric data processing performance warning.

4. The system of claim 1, wherein the primary switch device is configured, in response to detecting that the second switch device has been connected to the switch fabric and without subsequently receiving an instruction from a user, to:

determine whether the second switch device operating configuration of the second switch device matches the primary switch device operating configuration of the primary switch device; and modify, in response to determining that the second switch device operating configuration does not match the primary switch device operating configuration, the second switch device operating configuration such that the second switch device operating configuration matches the primary switch device operating configuration.

5. The system of claim 1, wherein the primary switch device is configured, in response to detecting that the second switch device has been connected to the switch fabric and without subsequently receiving an instruction from a user, to:

determine whether a second switch device security configuration of the second switch device matches a switch fabric security configuration of the switch fabric; and modify, in response to determining that the second switch device security configuration does not match the switch fabric security configuration, the second switch device security configuration such that the second switch device security configuration matches the switch fabric security configuration.

6. An Information Handling System (IHS), comprising:

a processing system; and a memory system that is coupled to the processing system and that includes instructions that, when executed by the processing system, cause the processing system to provide a switch fabric modification engine that is configured to:

detect that a second switch device has been connected to a switch fabric that includes the IHS and a plurality of first switch devices and, in response and without subsequently receiving an instruction from a user:

verify a switch fabric connectivity of the second switch device to the switch fabric that provides a switch device role for the second switch device by determining whether the switch fabric connectivity of the second switch device to the switch fabric enables data communications that are available to one or more of the plurality of first switch devices in the switch fabric that also have the switch device role, wherein the switch device role is either a spine switch device role or a leaf switch device role;

verify a second switch device operating configuration of the second switch device by determining that the second switch device operating configuration matches an IHS operating configuration of the IHS based on a second switch device operating system included in the second switch device operating configuration matching an HIS operating system included in the HIS operating configuration, and a second switch device firmware included in the second switch device operating configuration matching an HIS firmware included in the HIS operating configuration; and add, in response to verifying the switch fabric connectivity of the second switch device to the switch fabric and the second switch device operating configuration of the second switch device, the second switch device to the switch fabric.

7. The IHS of claim 6, wherein the switch fabric modification engine is configured, in response to detecting that the second switch device has been connected to the switch fabric and without subsequently receiving an instruction from a user, to:

determine whether addition of the second switch device to the switch fabric will degrade a switch fabric data transmission bandwidth of the switch fabric; and provide, in response to determining that the addition of the second switch device to the switch fabric will degrade the switch fabric data transmission bandwidth of the switch fabric, a degraded switch fabric data transmission bandwidth warning.

8. The IHS of claim 6, wherein the switch fabric modification engine is configured, in response to detecting that the second switch device has been connected to the switch fabric and without subsequently receiving an instruction from a user, to:

determine whether addition of the second switch device to the switch fabric will degrade a switch fabric data processing performance of the switch fabric; and provide, in response to determining that the addition of the second switch device to the switch fabric will degrade the switch fabric data processing performance of the switch fabric, a degraded switch fabric data processing performance warning.

9. The IHS of claim 6, wherein the switch fabric modification engine is configured, in response to detecting that the second switch device has been connected to the switch fabric and without subsequently receiving an instruction from a user, to:

determine whether the second switch device operating configuration of the second switch device matches the IHS operating configuration of the IHS; and modify, in response to determining that the second switch device operating configuration does not match the IHS operating configuration, the second switch device operating configuration such that the second switch device operating configuration matches the IHS operating configuration.

10. The IHS of claim 6, wherein the switch fabric modification engine is configured, in response to detecting that the second switch device has been connected to the switch fabric and without subsequently receiving an instruction from a user, to:

determine whether a second switch device security configuration of the second switch device matches a switch fabric security configuration of the switch fabric; and modify, in response to determining that the second switch device security configuration does not match the switch fabric security configuration, the second switch device security configuration such that the second switch device security configuration matches the switch fabric security configuration.

11. A method for modifying a switch fabric, comprising:

detecting, by a primary switch device that is included in a switch fabric with a plurality of first switch devices and that has a primary switch device operating configuration that includes each of a primary switch device operating system and primary switch device firmware, that a second switch device has been connected to the switch fabric that has a second switch device operating configuration that includes each of a second switch device operating system and second switch device firmware and, in response and without subsequently receiving an instruction from a user:

verifying, by the primary switch device, a switch fabric connectivity of the second switch device to the switch fabric that provides a switch device role for the second switch device by determining whether the switch fabric connectivity of the second switch device to the switch fabric enables data communications that are available to one or more of the plurality of first switch devices that also have the switch device role, wherein the switch device role is either a spine switch device role or a leaf switch device role;

verifying, by the primary switch device, a second switch device operating configuration of the second switch device by determining that the second switch device operating configuration matches a primary switch device operating configuration of the primary switch device based on the second switch device operating system matching the primary switch device operating system and the second switch device firmware matching the primary switch device firmware; and adding, by the primary switch device in response to verifying the switch fabric connectivity of the second switch device to the switch fabric and the second switch device operating configuration of the second switch device, the second switch device to the switch fabric.

12. The method of claim 11, further comprising:

determining, by the primary switch device without subsequently receiving an instruction from a user following detection that the second switch device has been connected to the switch fabric, whether addition of the second switch device to the switch fabric will degrade a switch fabric data transmission bandwidth of the switch fabric; and providing, by the primary switch device in response to determining that the addition of the second switch device to the switch fabric will degrade the switch fabric data transmission bandwidth of the switch fabric without subsequently receiving an instruction from a user following detection that the second switch device has been connected to the switch fabric, a degraded switch fabric data transmission bandwidth warning.

13. The method of claim 11, further comprising:

determining, by the primary switch device without subsequently receiving an instruction from a user following detection that the second switch device has been connected to the switch fabric, whether addition of the second switch device to the switch fabric will degrade a switch fabric data processing performance of the switch fabric; and providing, by the primary switch device in response to determining that the addition of the second switch device to the switch fabric will degrade the switch fabric data processing performance of the switch fabric without subsequently receiving an instruction from a user following detection that the second switch device has been connected to the switch fabric, a degraded switch fabric data processing performance warning.

14. The method of claim 11, further comprising:

determining, by the primary switch device without subsequently receiving an instruction from a user following detection that the second switch device has been connected to the switch fabric, whether the second switch device operating configuration of the second switch device matches the primary switch device operating configuration of the primary switch device; and modifying, by the primary switch device in response to determining that the second switch device operating configuration does not match the primary switch device operating configuration without subsequently receiving an instruction from a user following detection that the second switch device has been connected to the switch fabric, the second switch device operating configuration such that the second switch device operating configuration matches the primary switch device operating configuration.

15. The method of claim 11, further comprising:

determining, by the primary switch device without subsequently receiving an instruction from a user following detection that the second switch device has been connected to the switch fabric, whether a second switch device security configuration of the second switch device matches a switch fabric security configuration of the switch fabric; and modifying, by the primary switch device in response to determining that the second switch device security configuration does not match the switch fabric security configuration without subsequently receiving an instruction from a user following detection that the second switch device has been connected to the switch fabric, the second switch device security configuration such that the second switch device security configuration matches the switch fabric security configuration.

* * * * *